United States Patent
Oliphant et al.

(10) Patent No.: US 10,609,063 B1
(45) Date of Patent: *Mar. 31, 2020

(54) COMPUTER PROGRAM PRODUCT AND APPARATUS FOR MULTI-PATH REMEDIATION

(71) Applicant: SecurityProfiling, LLC, Garland, TX (US)

(72) Inventors: Brett M. Oliphant, Plano, TX (US); John P. Blignaut, West Lafayette, IN (US)

(73) Assignee: SecurityProfiling, LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,978

(22) Filed: May 30, 2017

Related U.S. Application Data

(63) Continuation of application No. 14/816,931, filed on Aug. 3, 2015, now Pat. No. 10,050,988, which is a
(Continued)

(51) Int. Cl.
*H04L 29/06* (2006.01)
*G06F 21/57* (2013.01)
(Continued)

(52) U.S. Cl.
CPC .......... *H04L 63/1433* (2013.01); *G06F 21/50* (2013.01); *G06F 21/55* (2013.01);
(Continued)

(58) Field of Classification Search
None
See application file for complete search history.

(56) References Cited

U.S. PATENT DOCUMENTS 6,301,668 B1 * 10/2001 Gleichauf ............... H04L 41/12
726/22
6,301,699 B1 * 10/2001 Hollander ............... G06F 21/55
717/131

(Continued)

OTHER PUBLICATIONS

Chang, Edward S., et al. "Managing cyber security vulnerabilities in large networks." Bell Labs technical journal 4.4 (1999): 252-272. (Year: 1999).*

(Continued)

*Primary Examiner* — Madhuri R Herzog
(74) *Attorney, Agent, or Firm* — Patrick E. Caldwell, Esq.; The Caldwell Firm, LLC

(57) ABSTRACT

A system, method, and computer program product are provided for a database associating a plurality of device vulnerabilities to which computing devices can be subject with a plurality of remediation techniques that collectively remediate the plurality of device vulnerabilities. Each of the device vulnerabilities is associated with at least one remediation technique. Each remediation technique associated with a particular device vulnerability remediates that particular vulnerability. Further, each remediation technique has a remediation type are selected from the type group consisting of patch, policy setting, and configuration option. Still yet, a first one of the device vulnerabilities is associated with at least two alternative remediation techniques.

70 Claims, 12 Drawing Sheets

Related U.S. Application Data continuation of application No. 14/499,230, filed on Sep. 28, 2014, now Pat. No. 9,100,431, which is a continuation-in-part of application No. 14/138,014, filed on Dec. 21, 2013, now Pat. No. 9,117,069, which is a continuation of application No. 10/882,852, filed on Jul. 1, 2004, now abandoned.

(60) Provisional application No. 60/484,085, filed on Jul. 1, 2003.

(51) Int. Cl.
    *G06F 21/55*     (2013.01)
    *G06F 21/50*     (2013.01)

(52) U.S. Cl.
    CPC ............ *G06F 21/554* (2013.01); *G06F 21/57* (2013.01); *G06F 21/577* (2013.01); *H04L 63/02* (2013.01); *H04L 63/0227* (2013.01); *H04L 63/14* (2013.01); *H04L 63/145* (2013.01); *H04L 63/1408* (2013.01); *H04L 63/1416* (2013.01); *H04L 63/1441* (2013.01); *H04L 63/20* (2013.01); *H04L 63/0263* (2013.01)

(56) References Cited

U.S. PATENT DOCUMENTS

| | | | | |
|---|---|---|---|---|
| 6,415,321 | B1 * | 7/2002 | Gleichauf | H04L 41/00 |
| | | | | 709/224 |
| 6,550,012 | B1 * | 4/2003 | Villa | H04L 63/0218 |
| | | | | 713/168 |
| 6,990,660 | B2 | 1/2006 | Moshir | G06F 8/62 |
| | | | | 709/223 |
| 7,152,105 | B2 * | 12/2006 | McClure | H04L 41/12 |
| | | | | 709/224 |
| 7,181,769 | B1 * | 2/2007 | Keanini | H04L 63/1416 |
| | | | | 713/166 |
| 7,257,630 | B2 * | 8/2007 | Cole | G02B 5/3083 |
| | | | | 709/224 |
| 7,509,681 | B2 * | 3/2009 | Flowers | G06F 21/552 |
| | | | | 713/151 |
| 7,712,138 | B2 * | 5/2010 | Zobel | G06F 21/577 |
| | | | | 709/224 |
| 2003/0126472 | A1 * | 7/2003 | Banzhof | G06F 21/577 |
| | | | | 726/25 |
| 2003/0204632 | A1 * | 10/2003 | Willebeek-LeMair | |
| | | | | H04L 29/06 |
| | | | | 709/249 |
| 2005/0193430 | A1 * | 9/2005 | Cohen | G06F 21/577 |
| | | | | 726/25 |
| 2005/0235360 | A1 * | 10/2005 | Pearson | H04L 29/06 |
| | | | | 726/23 |
| 2006/0101517 | A1 * | 5/2006 | Banzhof | G06F 21/577 |
| | | | | 726/25 |
| 2007/0011319 | A1 * | 1/2007 | McClure | G02B 6/105 |
| | | | | 709/224 |

OTHER PUBLICATIONS

Action Summary for U.S. Appl. No. 14/834,102 dated Aug. 24, 2918.
Action Summary for U.S. Appl. No. 15/608,981 dated Nov. 05, 2018.
Action Summary for U.S. Appl. No. 15/608,983 dated Sep. 11, 2018.
Notice of Allowance for U.S. Appl. No. 15/608,983 dated Feb. 4, 2019.
Notice of Appeal Filed Nov. 25, 2019 for U.S. Appl. No. 15/608,981.
Advisory Action Filed Aug. 13, 2019 for U.S. Appl. No. 15/608,981.
Notice of Allowance dated Sep. 24, 2019 for U.S. Appl. No. 15/608,983.

* cited by examiner

COMPUTER PROGRAM PRODUCT AND APPARATUS FOR MULTI-PATH REMEDIATION

CROSS-REFERENCE TO RELATED APPLICATIONS

This application is a continuation of, and claims priority to, U.S. application Ser. No. 14/816,931, filed Aug. 3, 2015, which, in turn, is a continuation of U.S. application Ser. No. 14/499,230, now U.S. Pat. No. 9,100,431, filed Sep. 28, 2014 which, in turn, is a continuation-in-part of U.S. application Ser. No. 14/138,014 filed Dec. 21, 2013, now U.S. Pat. No. 9,117,069, which, in turn, is a continuation of U.S. application Ser. No. 10/882,852 filed Jul. 1, 2004 which, in turn, claims priority to U.S. App. No. 60/484,085 filed Jul. 1, 2003, which are all incorporated herein by reference in their entirety for all purposes.

FIELD OF THE INVENTION

The present invention relates to computer systems, and more particularly to management of security of computing and network devices that are connected to other such devices.

SUMMARY

A system, method, and computer program product are provided for a database associating a plurality of device vulnerabilities to which computing devices can be subject with a plurality of remediation techniques that collectively remediate the plurality of device vulnerabilities. Each of the device vulnerabilities is associated with at least one remediation technique. Each remediation technique associated with a particular device vulnerability remediates that particular vulnerability. Further, each remediation technique has a remediation type are selected from the type group consisting of patch, policy setting, and configuration option. Still yet, a first one of the device vulnerabilities is associated with at least two alternative remediation techniques.

DETAILED DESCRIPTION

Figure 1:
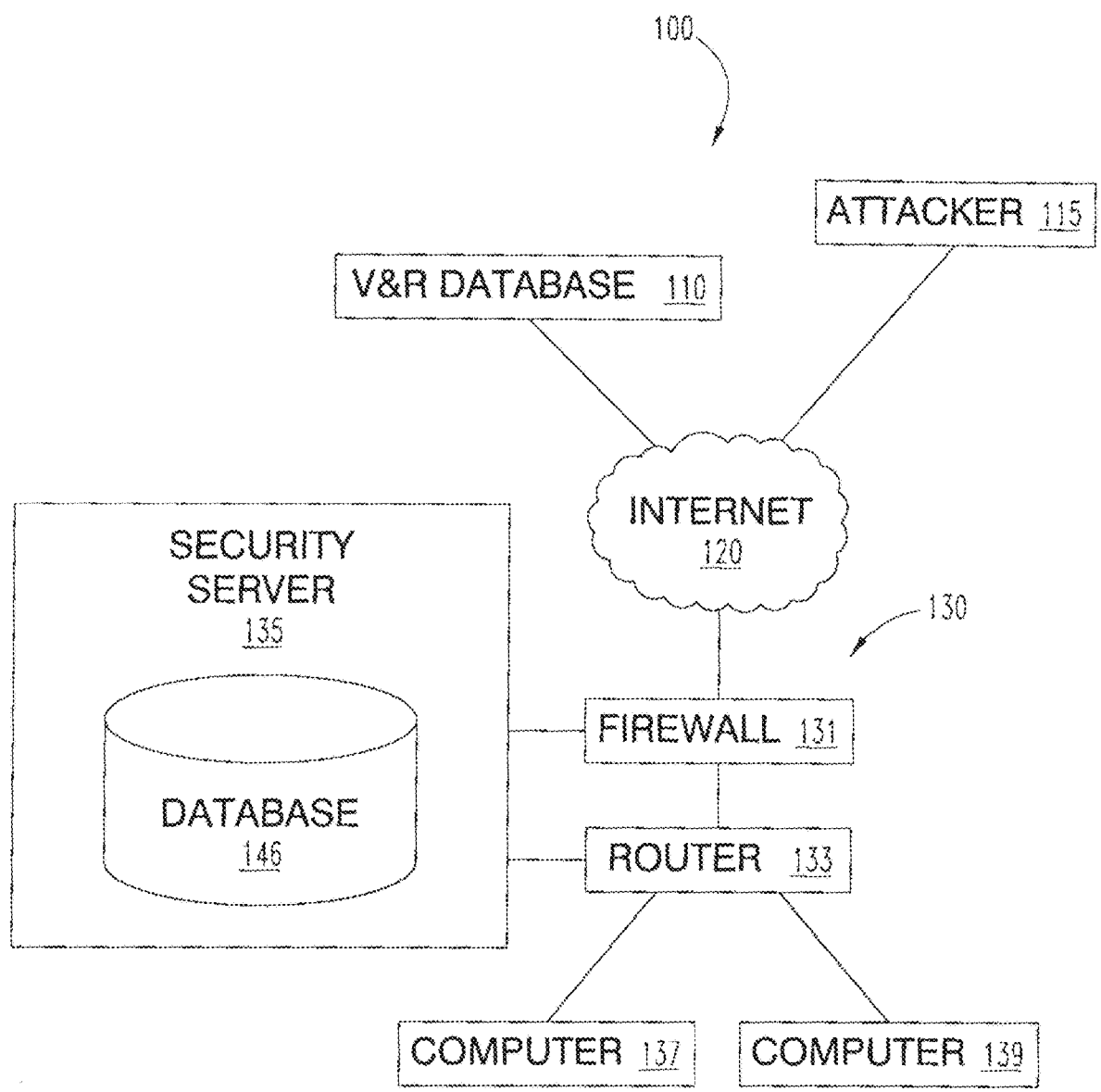
FIG. 1 is a block diagram of a networked system of computers in one embodiment of the present invention.

Glossary data warehouse=a component that contains vulnerabilities and updates for devices that operate on at least one network NOC server=network operations center server that periodically synchronize latest vulnerability and update data with other servers.

SDK=software development kit that allows programmers to develop security applications that access data collected in a database CM application=change management application that controls documentation and logging of change.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present invention in one embodiment operates in the context of a network as shown in FIG. 1. System 100 includes a vulnerability and remediation database 110 connected by Internet 120 to subnet 130. In this exemplary embodiment, firewall 131 serves as the gateway between Internet 120 and the rest of subnet 130. Router 133 directs connections between computers 137 and each other and other devices on Internet 120. Server 135 collects certain information and provides certain data services that will be discussed in further detail herein.

In particular, security server 135 includes processor 142, and memory 144 encoded with programming instructions executable by processor 142 to perform several important security-related functions. For example, security server 135 collects data from devices 131, 133, 137, and 139, including the software installed on those devices, their configuration and policy settings, and patches that have been installed. Security server 135 also obtains from vulnerability and remediation database 110 a regularly updated list of security vulnerabilities in software for a wide variety of operating systems, and even in the operating systems themselves. Security server 135 also downloads a regularly updated list of remediation techniques that can be applied to protect a device from damage due to those vulnerabilities. In one embodiment, each vulnerability in remediation database 110 is identified by a vulnerability identifier, and the vulnerability identifier can be used to retrieve remediation information from database 110 (and from database 146, discussed below in relation to FIG. 2).

In one embodiment, computers 137 and 139 each comprise a processor 152, 162, memory 154, 164, and storage 156, 166. Computer 137 executes a client-side program (stored in storage 156, loaded into memory 154, and executed by processor 152) that maintains an up-todate collection of information regarding the operating system, service pack (if applicable), software, and patches installed on computer 137, and the policies and configuration data (including configuration files, and elements that may be contained in files, such as *.ini and *.conf files and registry information, for example), and communicates that information on a substantially real-time basis to security server 135. In an alternative embodiment, the collection of information is not retained on computer 137, but is only communicated once to security server 135, then is updated in real time as changes to that collection occur.

Computer 139 stores, loads, and executes a similar software program that communicates configuration information pertaining to computer 139 to security server 135, also substantially in real time. Changes to the configuration registry in computer 139 are monitored, and selected changes are communicated to security server 135 so that relevant information is always available. Security server 135 may connect directly to and request software installation status and configuration information from firewall 131 and router 133, for embodiments wherein firewall 131 and router 133 do not have a software program executing on them to communicate this information directly.

This collection of information is made available at security server 135, and combined with the vulnerability and remediation data from source 110. The advanced functionality of system 100 is thereby enabled as discussed further herein.

Figure 2:
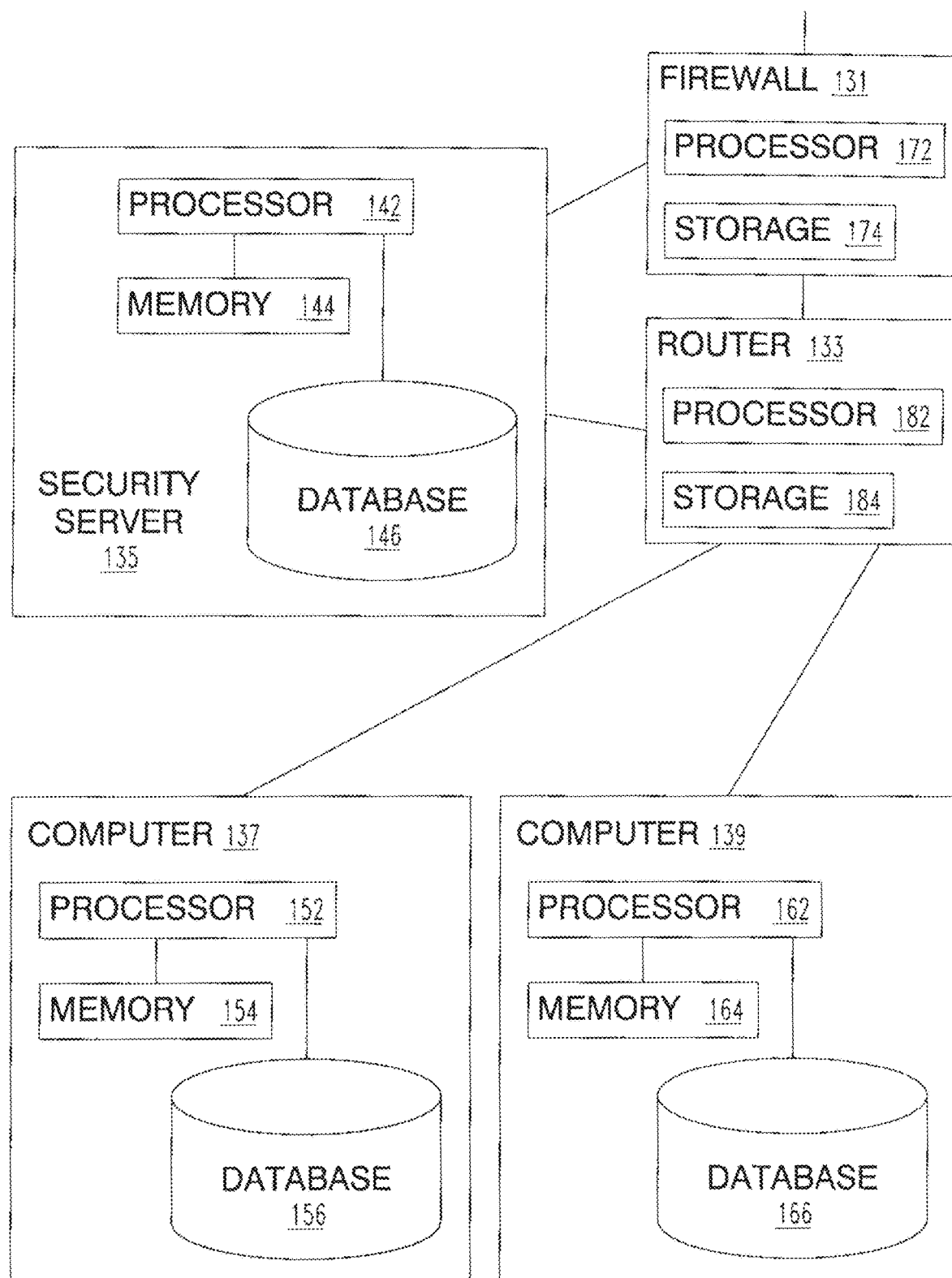
FIG. 2 is a block diagram showing components of several computing devices in the system of FIG. 1.

Turning to FIG. 2, one sees additional details and components of the devices in subnet 130. Computers 137 and 139 are traditional client or server machines, each having a processor 152, 162, memory 154, 164, and storage 156, 166. Firewall 131 and router 133 also have processors 172, 182 and storage 174, 184, respectively, as is known in the art. In this embodiment, devices 137 and 139 each execute a client-side program that continuously monitors the software installation and configuration status for that device. Changes to that status are communicated in substantially real time to security server 135, which continuously maintains the information in database 146. Security server 135 connects directly to firewall 131 and router 133 to obtain software installation and configuration status for those devices in the absence of a client-side program running thereon.

Processors 142, 152, 162 may each be comprised of one or more components configured as a single unit. Alternatively, when of a multi-component form, processor 142, 152, 162 may each have one or more components located remotely relative to the others. One or more components of processor 142, 152, 162 may be of the electronic variety defining digital circuitry, analog circuitry, or both. In one embodiment, processor 142, 152, 162 are of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

Memories 144, 154, 164 may include one or more types of solid-state electronic memory, magnetic memory, or optical memory, just to name a few. By way of non-limiting example, memory 40b may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard drive, floppy disk, tape, or cartridge media; or a combination of any of these memory types. Also, memories 144, 154, 164 may be volatile, nonvolatile, or a hybrid combination of volatile and nonvolatile varieties.

In this exemplary embodiment, storage 146, 156, 166 comprises one or more of the memory types just given for memories 144, 154, 164, preferably selected from the non-volatile types.

Figure 3:
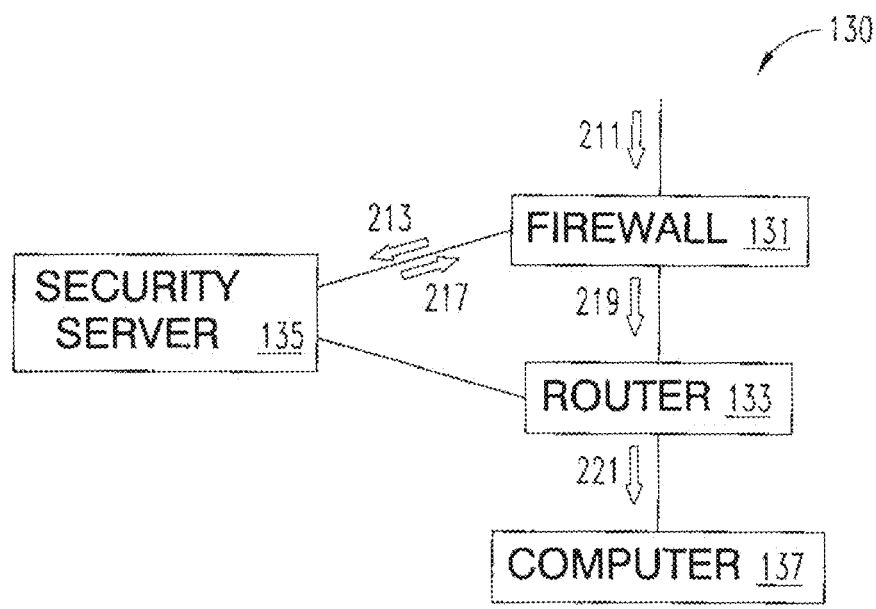
FIGS. 3 and 4 trace signals that travel through the system of FIGS. 1 and 2 and the present invention is applied to them.

This collection of information is used by system 100 in a wide variety of ways. With reference to FIG. 3, assume for example that a connection request 211 arrives at firewall 131 requesting that data be transferred to computer 137. The payload of request 211 is, in this example, a probe request for a worm that takes advantage of a particular security vulnerability in a certain computer operating system. Based on characteristics of the connection request 211, firewall 131 sends a query 213 to security server 135. Query 213 includes information that security server 135 uses to determine (1) the intended destination of connection request 211, and (2) some characterization of the payload of connection request 211, such as a vulnerability identifier. Security server 135 uses this information to determine whether connection request 211 is attempting to take advantage of a particular known vulnerability of destination machine 137, and uses information from database 146 (see FIG. 2) to determine whether the destination computer 137 has the vulnerable software installed, and whether the vulnerability has been patched on computer 137, or whether computer 137 has been configured so as to be invulnerable to a particular attack.

Security server 135 sends result signal 217 back to firewall 131 with an indication of whether the connection request should be granted or rejected. If it is to be granted, firewall 131 passes the request to router 133 as request 219, and router 133 relays the request as request 221 to computer 137, as is understood in the art. If, on the other hand, signal 217 indicates that connection request 211 is to be rejected, firewall 133 drops or rejects the connection request 211 as is understood in the art.

Figure 4:
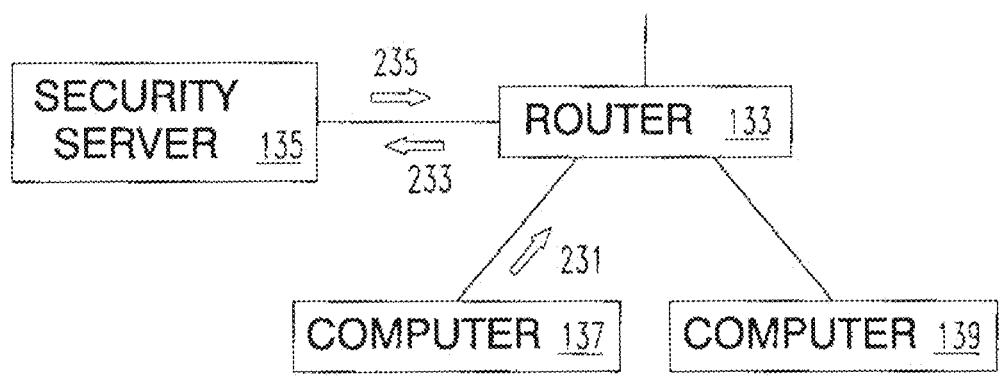

Analogous operation can protect computers within subnet 130 from compromised devices within subnet 130 as well. For example, FIG. 4 illustrates subnet 130 with computer 137 compromised. Under the control of a virus or worm, for example, computer 137 sends connection attempt 231 to router 133 in an attempt to probe or take advantage of a potential vulnerability in computer 139. On receiving connection request 231, router 133 sends relevant information about request 231 in a query 233 to security server 135. Similarly to the operation discussed above in relation to FIG. 3, security server 135 determines whether connection request 231 poses any threat, and in particular any threat to software on computer 139. If so, security server 135 determines whether the vulnerability has been patched, and if not, it determines whether computer 139 has been otherwise configured to avoid damage due to that vulnerability. Security server 135 replies with signal 235 to query 233 with that answer. Router 133 uses response 235 to determine whether to allow the connection attempt.

In some embodiments, upon a determination by security server 135 that a connection attempt or other attack has occurred against a computer that is vulnerable (based on its current software, patch, policy, and configuration status), security server 135 selects one or more remediation techniques from database 146 that remediate the particular vulnerability. Based on a prioritization previously selected by an administrator or the system designer, the remediation technique(s) are applied (1) to the machine that was attacked, (2) to all devices subject to the same vulnerability (based on their real-time software, patch, policy, and configuration status), or (3) to all devices to which the selected remediation can be applied.

In various embodiments, remediation techniques include the closing of open ports on the device; installation of a patch that is known to correct the vulnerability; changing the device's configuration; stopping, disabling, or removing services; setting or modifying policies; and the like. Furthermore, in various embodiments, events and actions are logged (preferably in a non-volatile medium) for later analysis and review by system administrators. In these embodiments, the log also stores information describing whether the target device was vulnerable to the attack.

A real-time status database according to the present invention has many other applications as well. In some embodiments, the database 146 is made available to an administrative console running on security server 135 or other administrative terminal. When a vulnerability is newly discovered in software that exists in subnet 130, administrators can immediately see whether any devices in subnet 130 are vulnerable to it, and if so, which ones. If a means of remediation of the vulnerability is known, the remediation can be selectively applied to only those devices subject to the vulnerability.

In some embodiments, the database 146 is integrated into another device, such as firewall 131 or router 133, or an individual device on the network. While some of these embodiments might avoid some failures due to network instability, they substantially increase the complexity of the device itself. For this reason, as well as the complexity of maintaining security database functions when integrated with other functions, the network-attached device embodiment described above in relation to FIGS. 1-4 is one possible embodiment.

In one embodiment, a software development kit (SDK) allows programmers to develop security applications that access the data collected in database 146. The applications developed with the SDK access information using a defined application programming interface (API) to retrieve vulnerability, remediation, and device status information available to the system. The applications then make security-related determinations and are enabled to take certain actions based on the available data.

In these exemplary systems, "configuration information" for each device may take the form of initialization files (often named *.ini or *.conf), configuration registry (such as, the Windows Registry on Microsoft WINDOWS operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, security information management system is provided, wherein a database of potential vulnerabilities is maintained, along with data describing remediation techniques (patches, policy settings, and configuration options) available to protect against them. At least one vulnerability is associated in the database with multiple available remediation techniques. In one embodiment, the system presents a user with the list of remediation techniques available to protect against a known vulnerability, accepts the user's selection from the list, and executes the selected technique. In other embodiments, the system uses a predetermined prioritization schedule to automatically select among the available remediation techniques, then automatically executes the selected technique.

One embodiment of the present invention is a database of information about a plurality of devices, updated in real-time and used by an application to make a security-related decision. The database stores data indicating the installed operating system(s), installed software, patches that have been applied, system policies that are in place, and configuration information for each device. The database answers queries by one or more devices or applications attached by a network to facilitate security-related decision making. In one form of this embodiment, a firewall or router handles a connection request or maintenance of a connection based on the configuration information stored in the database that relates to one or both of the devices involved in the transmission.

In one embodiment, database 146 includes vulnerability and remediation information such that, for at least one vulnerability, multiple methods of remediating the vulnerability are specified. When the system has occasion to implement or offer remediation of a vulnerability, all known alternatives are presented that are relevant to the device or machine's particular configuration or setup. For example, when a vulnerability of a device is presented to an administrator, the administrator is given a choice among the plurality of remediation options to remediate the vulnerability. In some embodiments, the administrator can select a preferred type of remediation that will be applied if available and a fallback type. For example, an administrator may select application of a policy setting over installation of a software patch, so that the risk of disruption of critical business systems is minimized.

In other embodiments, an administrator or other user is presented with a set of user interface elements that identify multiple options for remediating and identifying the vulnerability. The administrator or user selects the method to be used, and that remediation is applied to the vulnerable device(s).

Figure 5A:
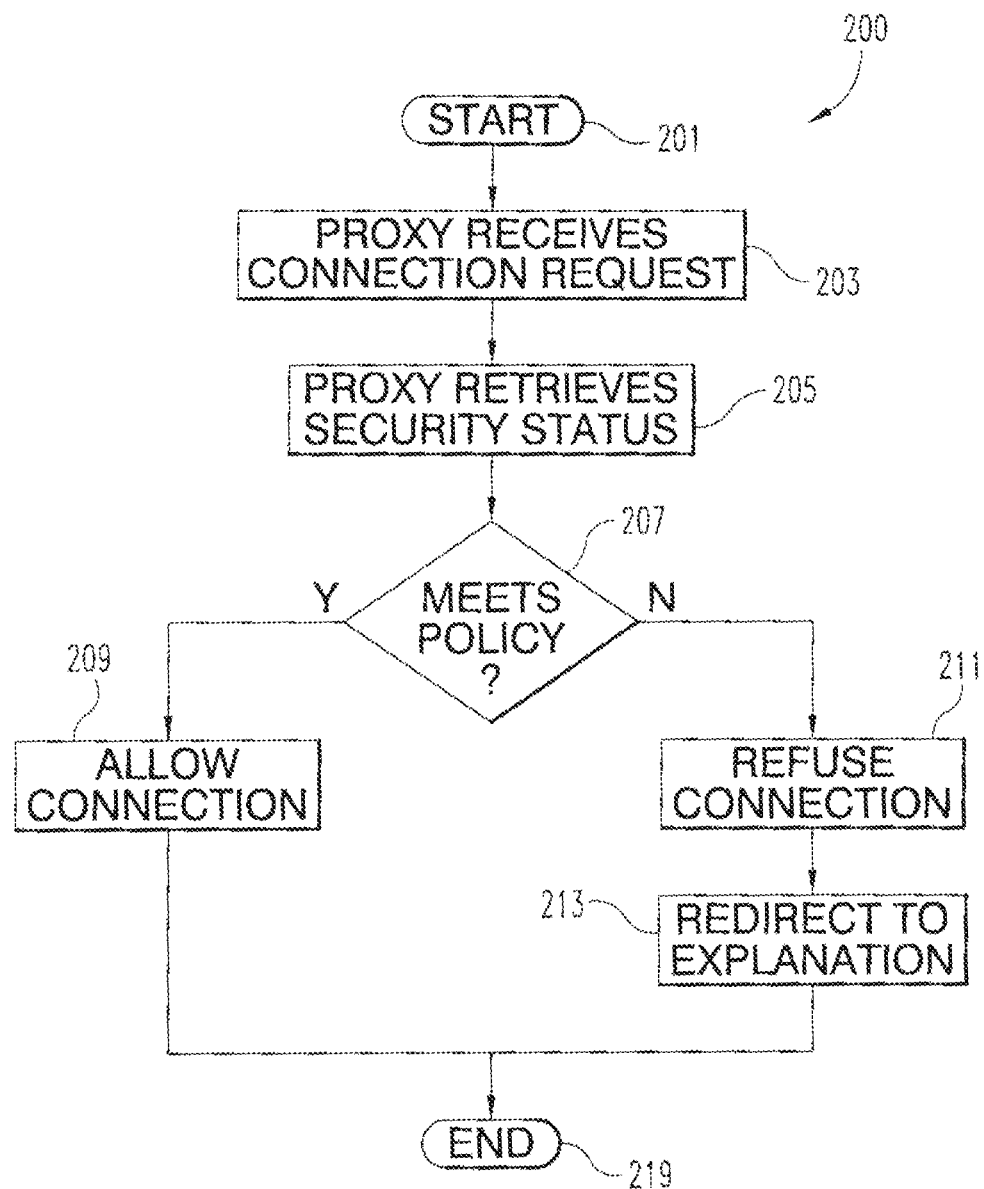
FIG. 5A is a flow chart of a filtering proxy method according to one embodiment of the present invention.

FIG. 5A is a flow chart of a filtering proxy method according to one embodiment of the present invention.

In use, a database maintains security status information on each device in a network, based on whether the device's operating system, software, and patches are installed and configured to meet a baseline level of security. A network gateway proxy blocks connection attempts from devices for which the database indicates a substandard security status, but allows connections from other devices to pass normally. The database is preferably updated on a substantially real-time basis by client-side software run by each device in the network.

Another form of the present embodiment includes a connection proxy that filters connections originating within the network. In particular, one embodiment employs a proxy that denies connection attempts originating with devices in the network when the originating device has a status, reflected in the database, that fails to meet predetermined security characteristics in terms of installed operating system and software, patch levels, and system policy and configuration registry information.

In this embodiment, router 133 serves as a connection proxy for devices and subnet 130, as will be understood by those skilled in the art. In addition to basic proxy functionality, however, router 133 accesses database 146 on security server 135 via the SDK at each connection attempt. If, for example, device 137 attempts to connect to any device where the connection must pass through the proxy server (router 133 in this example), such as a device on Internet 120, router 133 checks the security status of device 137 in database 146, using the real-time status therein to determine whether device 137 complies with one or more predetermined security policies. If it does, router 133 allows the connection to be made. If it does not, router 133 prevents the connection, preferably redirecting the connection to a diagnostic page that explains why the connection is not being made.

This system is illustrated by method 200 in FIG. 5A. Method 200 begins with start point 201. The proxy (router 133 in the above example) receives a connection request at block 203, then retrieves the security status of the source device at block 205. This preferably uses the real-time updated status information from database 146 (see FIG. 2) at decision block 207. If the security status indicates that the source device complies with the predetermined security policy, the proxy allows the connection at block 209. If not, the proxy refuses the connection at block 211 and redirects the connection to an explanation message (such as a locally generated web page or other message source) at block 213. In either case, method 200 ends at end point 219.

In possible embodiments, the determination and decision at block 207 apply a comprehensive minimum policy set that protects other devices in subnet 130 (see FIG. 1) from viruses, trojans, worms, and other malware that might be inadvertently and/or carelessly acquired due to the requested connection.

In another embodiment, a security information management system is provided, wherein client-side devices preferably collect and monitor information describing the operating system, software, and patches installed on the device(s), as well as configuration thereof. A database of this information is maintained, along with data describing vulnerabilities of available software and associated remediation techniques available for it. The system exposes an API to support security-related decisions by other applications. For example, an intrusion detection system (IDS) accesses the database to determine whether an actual threat exists and should be (or has been) blocked.

In another form of this embodiment, client software runs on each monitored device and reports configuration information to the database, so that the database has substantially real-time-current information.

The present embodiment of the present invention advantageously acquires the real-time status information from each client using client-side software. In this manner, a resource burden of monitoring is spread among the devices being monitored, and uses far fewer network resources in the process.

In these exemplary systems, "configuration information" for each device may take the form of initialization files (often named *.ini or *.conf), configuration registry (such as the Windows Registry on Microsoft Windows operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, a system maintains a database of vulnerabilities and associated remediation techniques. The remediation techniques include software patches, policy settings or changes, and registry settings or changes. This multi-faceted provides novel flexibility in management of security issues, and convenience for security administrators in both determining available options and selecting remediation steps for vulnerable systems.

In another embodiment of the present invention, patches, policy changes, software updates, and configuration changes are rolled out to devices on a network using a staged roll-out technique. In this technique, the change is applied to a selected device or set of devices identified by an administrator. After a predetermined amount of time passes, unless the administrator has canceled the roll-out, the change is applied to an additional group of devices on the network. Third- and fourth-tier groups may also be identified by the administrator, where implementation of the remediation or upgrade is automatically effected in subsequent stages a predetermined amount of time after the preceding stage roll-out. Thus, if no failures are noted following a more limited roll-out (on a first set of devices), then the remediation or upgrade is automatically applied to other devices. If, on the other hand, an error or failure is observed, the subsequent roll-out can be canceled so that further failures and problems are avoided.

Figure 5B:
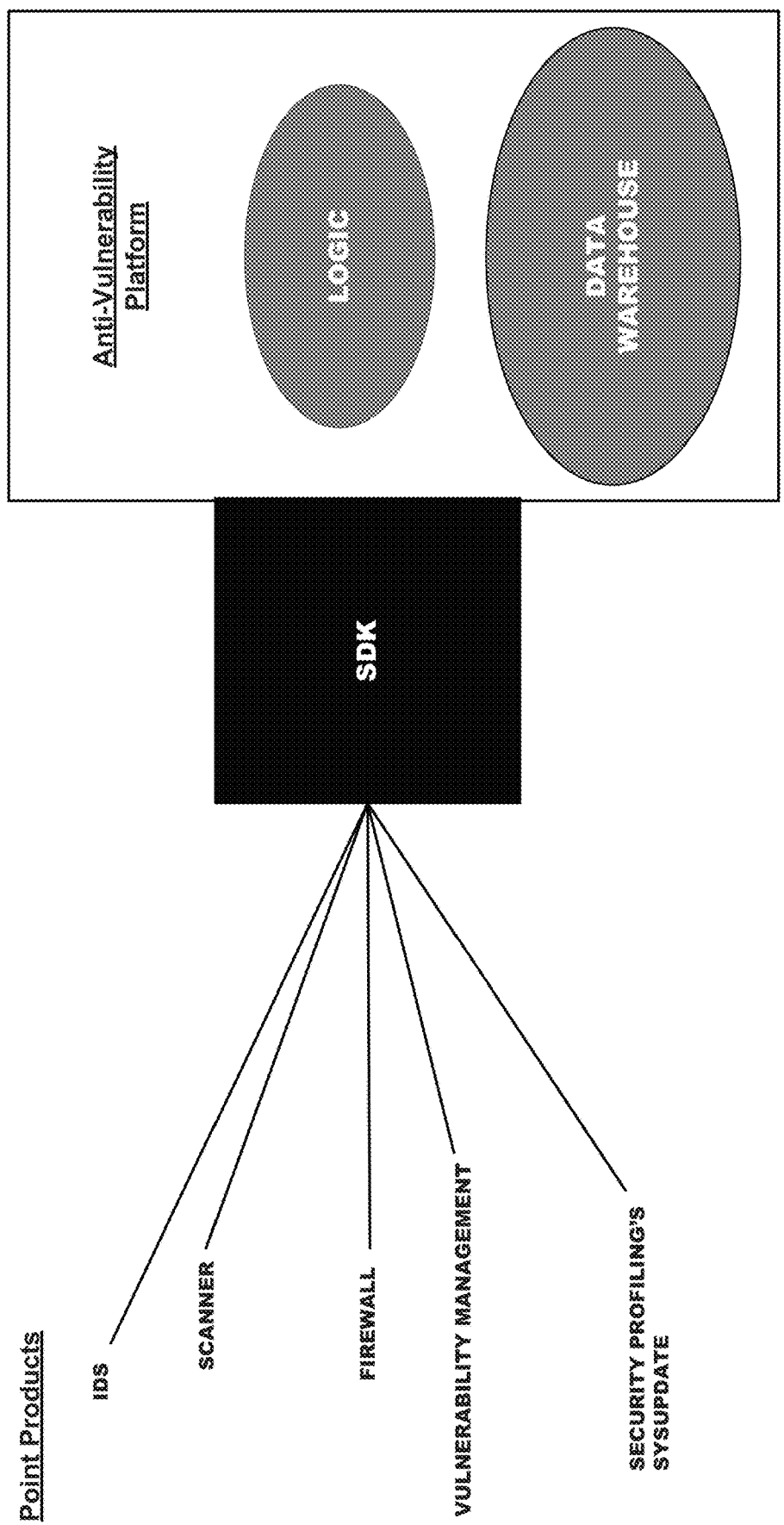
FIGS. 5B and 6 illustrate a platform, in accordance with possible embodiments.
Figure 6:
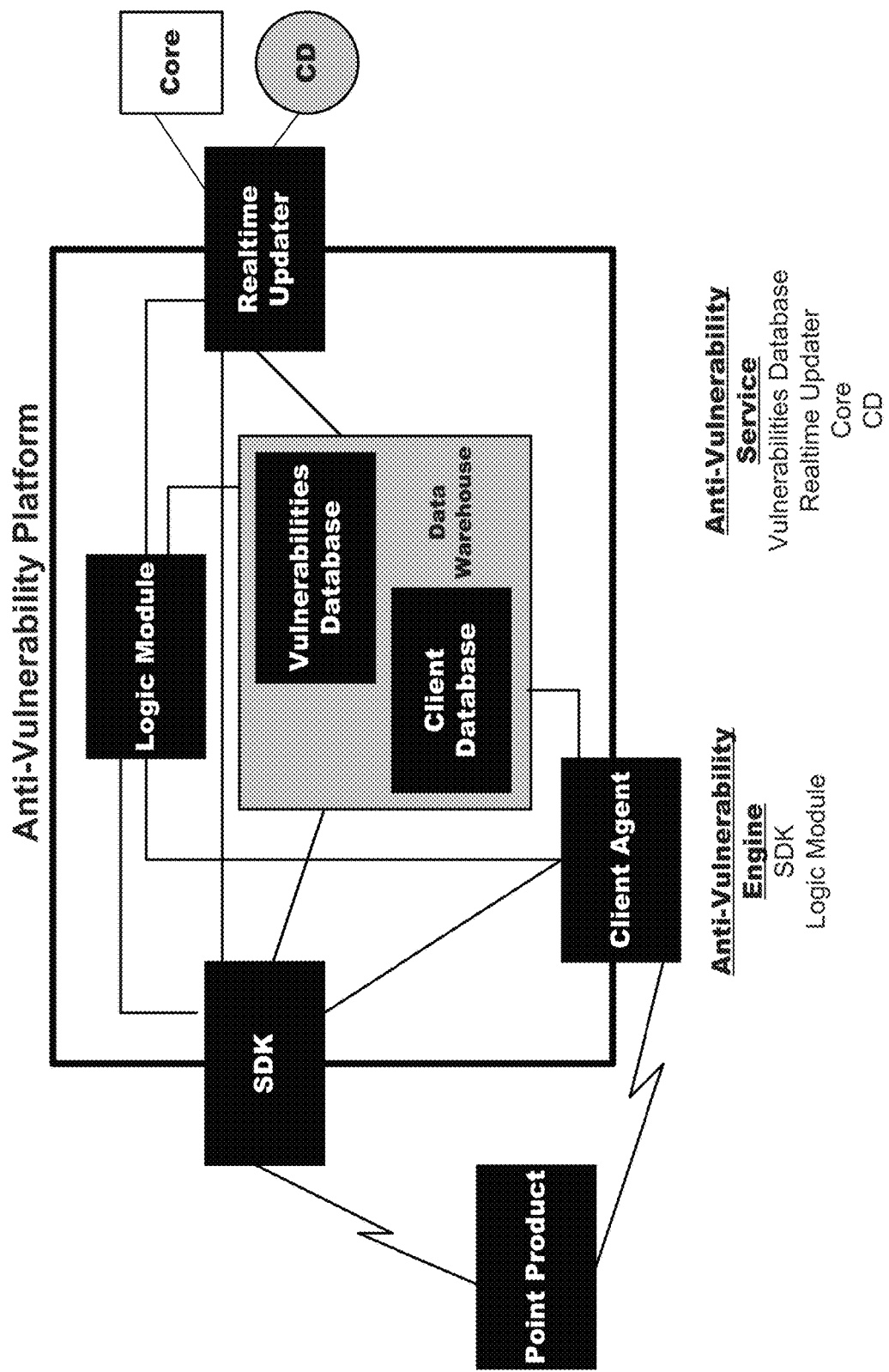

FIGS. 5B and 6 illustrate a platform, in accordance with possible embodiments.

In one possible embodiment, provided is a platform and underlying back end that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application. Thereby, the technology may improve system accuracy and efficiencies, minimize false positives and false negatives, and provide policy compliance and enforcement capabilities.

The latest network compromises are combining qualities of viruses, worms, and denial of service attacks into new blended attacks. Additionally, blended attacks may now utilize metamorphic or polymorphic abilities to change their signatures to avoid detection. To mitigate these new risks, organizations are now deploying a multi-tiered network defense strategy comprised of a variety of network security components layered at the perimeter and to internal network machines and devices. The security components are managed separately, and possibly their data is ported into a Security Information Management System (SIMS) correlation engine.

However, network security components and correlation engines rely on signatures or anomalies, producing an ever-increasing quantity of data, including false positive, benign, and erroneous events. They also lack the intelligence to identify, reference, or remediate the vulnerabilities targeted by the attack. Furthermore, the time and cost to acquire, manage, and maintain these numerous network security components is overwhelming the end user. Therefore, more sophisticated technology is provided to resolve these performance and management issues.

In one embodiment, technology may be provided that addresses these requirements by making each security component smarter and provides managers with remote remediation options. Thereby, improving system performance and streamlining management processes.

In one embodiment, an intelligent integration platform and SDK are provided to meet the above requirements.

In one embodiment, security products are enhanced and system intelligence may be provided. The same vulnerability data warehouse information is shared with the products so that more intelligent actions may then be taken to mitigate complex threats.

One embodiment cross-references the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable.

In one embodiment, network vulnerabilities are identified. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Examples of Anti-Vulnerability applications that may be integrated into network security products for enterprise and small office home office (SOHO) networks when integrated with one embodiment, via the SDK, will be described.

In one embodiment, update or patch deployment are provided, which remotely remediate network vulnerabilities and provide policy compliance and enforcement capabilities. And, for the consumer market, it may additionally support non-security related updates such as application version, performance, and bug-fix upgrades.

In one embodiment, an IDS may be provided that accurately determines if the targeted machine is actually vulnerable to an attack; virtually eliminates false positives and false negatives; and adds vulnerability remediation and policy compliance and enforcement functionalities.

In one embodiment, a scanner may be provided that virtually eliminates false positive and false negatives, and adds vulnerability remediation and policy compliance and enforcement functionalities.

In one embodiment, a firewall may be provided that virtually eliminates false positive and false negatives, preventing the security system from denying valid traffic to the organization—self-inflicted denial of service attacks—and adds vulnerability remediation, and policy compliance and enforcement functionalities.

In one embodiment, vulnerability management may be provided, as set forth above.

In one embodiment, multiple products are provided including an IDS, scanner, and firewall. Each may communicate with the same back-end data warehouse, sharing the same vulnerability information, attaining intelligence and more accurate information about the target and its vulnerabilities, thereby more effectively mitigating complex threats.

In one embodiment, change management may be provided, which may automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, the platform may also provide product upgrades and signature updates to each of these various security products.

The platform is comprised of the following software components: SDK, client agent, logic engine, and data warehouse stored on a dedicated on-site server. Network operations center (NOC) Servers periodically synchronize the customers' servers with the latest vulnerability and update data. See FIG. 5B.

The same client agent and on-site server support all security applications that are integrated onto the platform, thereby providing the added anti-vulnerability functionalities presented in the previous section.

There are two system requirements: TCP/IP connectivity, and supported network machines and devices. In one embodiment, platforms supported are set forth below in Table 1.

TABLE 1

All Windows Operating Systems and their applications
All UNIX variants
Cisco routers and firewalls
Toshiba network devices
Netgear network devices
Linksys network devices, including wireless access points Platform support is scalable to any network size or architecture; consumer, small office home office (SOHO), enterprise, and distributed networks.

In one embodiment, technology may be provided that includes a backend platform that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application, update application and the intelligent IDS. Thereby, the technology may improve system accuracy and efficiencies, minimize false positives and false negatives, and provide policy compliance and enforcement capabilities.

As shown in FIG. 5B, the technology may meet market requirements, presented in the next section.

For example, networks are probed at an ever-increasing frequency for vulnerabilities, which may be exploited with compromise attacks. To protect the network, administrators have traditionally set up perimeter defense strategies.

These strategies generally call for network managers to lock down core servers, and monitor/scan/filter all incoming and outgoing traffic at the network perimeter with several network security products such as antivirus and firewalls to identify and attempt to neutralize hackers and malicious code. In the past, these strategies worked well, however new threats are becoming more complex.

The latest malicious code may combine qualities of viruses, worms, and direct compromise attacks into new blended attacks. Virus payloads are becoming more complex and by using metamorphic or polymorphic abilities, viruses are able to change their signatures to avoid the fingerprint-type filtering that most applications employ.

To mitigate these new risks, organizations deploy a multi-tiered network defense strategy comprised of a variety of additional network security products layered at the perimeter and to internal network machines and devices. Such network security products include antivirus, firewall, scanners, and network and host based intrusion detection systems.

Each of these systems is based on specific signatures, rules, or anomalies of each attack and their variants, and do not identify and remediate the specific network vulnerabilities the attack is targeting. So each attack, and its variants, must be identified and analyzed, a signature prepared, then finally deployed to each point product on each customer's network. This process is uncoordinated among multiple disparate systems, and creates an ever-increasing number of signatures producing more and more attack alerts requiring immediate attention—many of which are erroneous. The security components are managed separately, and possibly their data is ported into a security information management system (SIMS) correlation engine.

Additionally, to proactively remediate the vulnerabilities the malicious code is targeting, administrators quickly and diligently update or "patch" each network machine and device, which is a time-consuming and costly process. Further compounding the burden on administrators, best practice and government compliance directives may require higher standards of network security and integrity to protect consumer privacy, and they are documented with change tracking and audit trail reports.

Therefore, it is increasingly difficult and costly to effectively mitigate new threats and manage numerous systems—particularly in an environment of rising security standards and policy compliance requirements.

Thus, the multi-tiered network defense strategy is falling short primarily for four reasons. First, there is an inability of multi-tiered network security products to communicate and share information necessary to mitigate blended threats, and minimize false positives and false negatives. The vulnerabilities targeted by malicious code are not accurately identified nor proactively remediated. The associated excessive aggregate cost of ownership of multiple systems. The excessive administrative burden and cost of managing and maintaining multiple systems.

Hence, there is a need to integrate systems, share information intelligently to better defend against blended threats, reduce management and cost requirements, and automate vulnerability identification and remediation functionalities, as presented in the high-level requirements.

In one embodiment, technology is provided to meet the following market requirements: integrate network security products to share information; provide system intelligence; and remediate network vulnerabilities.

In one embodiment, technology may integrate with and enable network security products to intelligently reference and share information from the same vulnerability data set, provide vulnerability identification and remediation functionalities, and efficiently meet policy compliance and enforcement requirements.

In one embodiment, the platform is a complimentary network security technology. When integrated into the defense strategy, it adds intelligence that more accurately and efficiently mitigates blended threats and offloads the time-consuming functions that burden network administrators.

In one embodiment, the platform enables network security products to share information via its proprietary logic engine to automatically cross-reference the threat identifier with the targeted machine's configuration to determine if it is actually vulnerable to that threat. Previously separate and uncoordinated processes are now more intelligent and automated, resulting in improved system accuracy and efficiency. Therefore the need to layer more and more point products and add a SIMS is reduced, in-turn decreasing the amount of data—particularly erroneous data—to manage. Subsequently, the costs to acquire, operate, and manage the additional multiple point products, and the need to implement a SIMS, are also reduced.

In one embodiment, the platform may also remotely and proactively remediate vulnerabilities by first determining which updates are needed and compatible with each machine or device, taking into account the OS, applications, or firmware installed. Then, the updates may be deployed, installed, and validated. Thereby, policy compliance is effectively and efficiently enforced, and documented.

In one embodiment, the present technology fulfills market requirements noted in the previous section. For example, it may integrate network security products and provides system intelligence. The same vulnerability data warehouse information is shared with all products so that more intelligent actions may then be taken to mitigate complex threats.

Still yet, it may cross-reference the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable. Thereby, minimizes erroneous, benign, and false positive data produced by each security product.

One embodiment identifies network vulnerabilities. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Various possible benefits include blended attacks being more effectively mitigated and the overwhelming management and maintenance burden on administrators to purchase, operate, and maintain multiple network security products being reduced, while increasing productivity, reducing costs, and more effectively and efficiently meeting policy compliance and enforcement requirements.

Table 2 illustrates a plurality of end user details.

TABLE 2

Supplements existing technology to better defend against blended attacks
Intelligently accesses the vulnerability data warehouse, and remediates vulnerabilities.
Offers policy compliance and enforcement functionality
Vulnerabilities may be automatically remediated, verified and documented, therefore enforcing compliance.
No additional software or hardware implementation costs
Anti-Vulnerability functionalities may be integrated into existing product platforms.
Reduces cost of ownership of multi network security products
Shared vulnerability data sets and added vulnerability remediation functionalities may reduce the number of network security products needed to adequately attain defense strategy requirements.
Reduces management and maintenance costs
Increased accuracy of vulnerability identification, remediation and policy enforcement, and reduction of false positives, false negatives and denial of service (DoS), significantly reduces management time and costs.
Manage more machines and devices on the network through one portal
Vulnerability remediation and policy compliance and enforcement may be integrated with existing security network security products, and their respective interfaces.
Minimize end user education/ absorption costs
Anti-Vulnerability applications are transparently integrated, retaining preexisting architecture, processes, and interfaces. Therefore, the end user experience remains the same, or improved with simplified or automated processes.
User experience remains the same additional time or costs to understand and execute new technologies are minimized
Anti-Vulnerability applications may be integrated transparently and seamlessly, and the pre-existing operational processes and user interfaces are virtually unchanged.

TABLE 2-continued

Supports both the enterprise and SOHO networks
Data warehouse contains vulnerabilities and updates for many machines
and devices that operate on both enterprise and SOHO networks.
Applications presented hereinafter Examples of applications that may be made available for enterprise and small office home office (SOHO) networks when integrated with Anti-Vulnerability technology via the SDK will now be set forth.

In one embodiment, update or patch deployment is provided. In one embodiment, a patch management and vulnerability remediation solution is provided. The technology enables products to add accurate vulnerability identification, remediation, verification, and policy compliance functions. With such technology, products may gain intelligence, accuracy and efficiency, eliminate false positives and false negatives, and ensure policy compliance, thereby saving the organization time and money. Such functionalities and benefits are available for both the enterprise and SOHO networks. And, for the consumer market, it may additionally support non-security related updates such as application version, performance, and bug-fix updates for widely distributed programs, which may optimize system performance and enhance the consumer experience.

In one embodiment, an IDS is provided. IDS products attempt to identify malicious code by signatures at both the network and host client level. While they may be able to identify malicious code by CVE ID or other identifier, and targeted machines by IP address, but they generally do not have the intelligence to determine if the any of the machines on the network are susceptible to that attack, or with finer granularity, if any machine has a specific vulnerability to that specific attack, or if the targeted vulnerability has already been patched. For example, if the malicious code has been written as a Windows based attack targeting a Windows vulnerability, is the Destination IP actually running Windows, or a UNIX variant? And, if Windows, is it vulnerable to the attack, or has it already been patched? IDS do not have the intelligence to answer these questions, and incident alerts are generated indiscriminately. Lastly, even if the targeted machine is vulnerable—it remains unremediated—an IDS does not have the capability to remediate it.

With the present embodiment, a product architect can integrate functionalities listed in the previous section to enable the IDS to access the Anti-Vulnerability logic engine and platform. It may then have the intelligence to determine if any machine on the network is susceptible to the attack, remediate the vulnerability, mitigate the attack, and verify policy compliance. Now, if no machines were susceptible to the attack, it is identified as an event but not an incident, no further data or alert is generated, and a management response is not required. Integrated products may gain intelligence, accuracy, and efficiency, eliminate false positives and false negatives, and ensure policy compliance, thereby saving the organization time and money. Such functionalities and benefits are available for both the enterprise and SOHO networks.

In one embodiment, scanners may be provided. Vulnerability scanners assess each machine on the network for vulnerabilities, and create lists of potential vulnerabilities to the system managers. The lists commonly contain many false positives and false negatives, burdening the system and managers with inaccuracies.

With the present embodiment, a product architect can integrate functionalities listed in the previous section to enable the scanner to access the logic engine and platform, and then have the intelligence to determine if the machine has actual vulnerabilities, remediate them, and verify policy compliance. Integrated products may gain intelligence, accuracy, and efficiency, eliminated false positives and false negatives, and ensured policy compliance, thereby saving the organization time and money.

In one embodiment, a firewall may be provided. "Smart" firewalls are based in part on signatures and other similar functionalities as the IDS products described above.

With the present embodiment, the firewall can determine whether an attack is valid or a false positive, thereby preventing the security system from denying valid traffic to the organization—self-inflicted DoS attacks. Such functionalities and benefits may be available for both the enterprise and SOHO networks.

In one embodiment, vulnerability management may be provided. Vulnerability management products enable managers to set policy and identify potential network vulnerabilities. They typically do not accurately identify each vulnerability on each network machine and device, nor remediate each vulnerability, meeting policy compliance enforcement requirements.

The present embodiment offers similar functionalities and benefits as the patch deployment products described above. In short, it enables products to add accurate vulnerability identification, remediation, verification, and policy compliance and enforcement. Such functionalities and benefits are available for both the enterprise and SOHO networks.

To this end, multiple products may be provided: IDS, scanner, firewall, and vulnerability management. Each product functions as the individual products noted above. Each may be deployed and operated on the network in a multi-tiered network defense strategy. They may be disparate system, and their signatures and update deployment schedules may vary. Therefore, the probability of mitigating a new and complex threat decreases, while management requirements and cost increases.

In one embodiment, they each may communicate with the same backend data warehouse, sharing the same vulnerability information, attaining intelligence and more accurate information about the target and its vulnerabilities, thereby more effectively mitigating complex threats. It may also enable the products to add accurate vulnerability identification, remediation, verification, and policy compliance and enforcement functionalities.

In one embodiment, change management (CM) may be provided. Existing CM applications control the documentation and logging of change throughout the enterprise. These applications ensure that an organization maintains consistent records of what happened and when. Currently administrators must independently recognize that a security patch/update must be deployed to a computer or group of computers.

The user enters the request in the system, through the pipelined process of change management the request would be approved, the patch/update would be manually installed by a user, then documented in the change management software that the process has been completed. While CM software assists in documentation, very little if any assistance may be provided to identify the patches/updates needed, nor verifying correct function after the update/patch is installed.

With the current possible embodiment, change management integration may greatly streamline this process further reducing total cost of ownership, ease of use, and a higher standard of documentation. The products may then automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, one possible embodiment may also provide product upgrades and signature updates to each of these various security products—including all of the technology benefits such as ensuring compliance of signature versions, logging, reporting, and verification of installation.

Thus, one possible embodiment includes an intelligent platform that may supplement any existing defense strategy. Once integrated with the technology, security products may share the same vulnerability data set to improve automation and accuracy—increasing efficiencies and minimizing false positives and false negatives. It also enables remote identification, management, and remediation of network vulnerabilities, and provides update deployment, validation, and reporting capabilities. Thereby, the technology improves network security and integrity, mitigation of blended threats, while increasing productivity, reducing total cost ownership, and more effectively and efficiently attaining policy compliance and enforcement requirements.

One embodiment provides IDS intelligence, accuracy and remote patching functions—IDS data output integrated with the aforementioned platform via the SDK. The platform's underlying backend including a logic engine and vulnerability data warehouse provides the added functions and performance.

Conventional IDS produce an ever-increasing quantity of alert data, including erroneous and false positive data. They also lack the intelligence to identify or remediate the vulnerabilities targeted by the attack. Furthermore, the cost of the acquiring, managing, and maintaining conventional IDS is overwhelming the end user.

Therefore, a more sophisticated, intelligent technology is provided to resolve these issues. In one embodiment, an intelligent IDS is provided to meet market requirements. The alert data output from a distribution of Snort is integrated with the platform via the SDK, which may add the following functions.

In one embodiment, it cross-references the threat's identifier with the target's configuration. The CVE ID, or other identifier, and the Destination IP address are fed into the logic engine where it cross-references the threat with the machine's configuration profile.

In one embodiment, it virtually eliminates false positives and false negatives. The backend accurately determines in real time if the targeted machine is susceptible to the attack. And, if the machine is not susceptible, it is filtered and reported back as an event and not an incident. No further data or alert is generated, and a management response is not required.

In one embodiment, it remotely remediates the vulnerability. When a machine is identified as vulnerable to an attack, an incident, a remediation function may be provided to the administrator to remotely deploy the appropriate update to the machine or device, install it, verifies the files and hashes, and document it with change tracking and audit trail reports.

Table 3 sets forth a plurality of features.

TABLE 3

Supports Windows and UNIX variants
Determines if targeted machine is vulnerable to an attack in real time
Filters out erroneous, benign and false positive alerts TABLE 3-continued Remotely patches targeted vulnerabilities in one click
Installs in minutes To this end, erroneous, benign, and false positive data is filtered out, and incidents may be remotely remediated. Therefore, complex threats are more effectively and efficiently mitigated. Correspondingly, the management and maintenance burden on administrators is reduced, saving time and effort.

Figure 7:
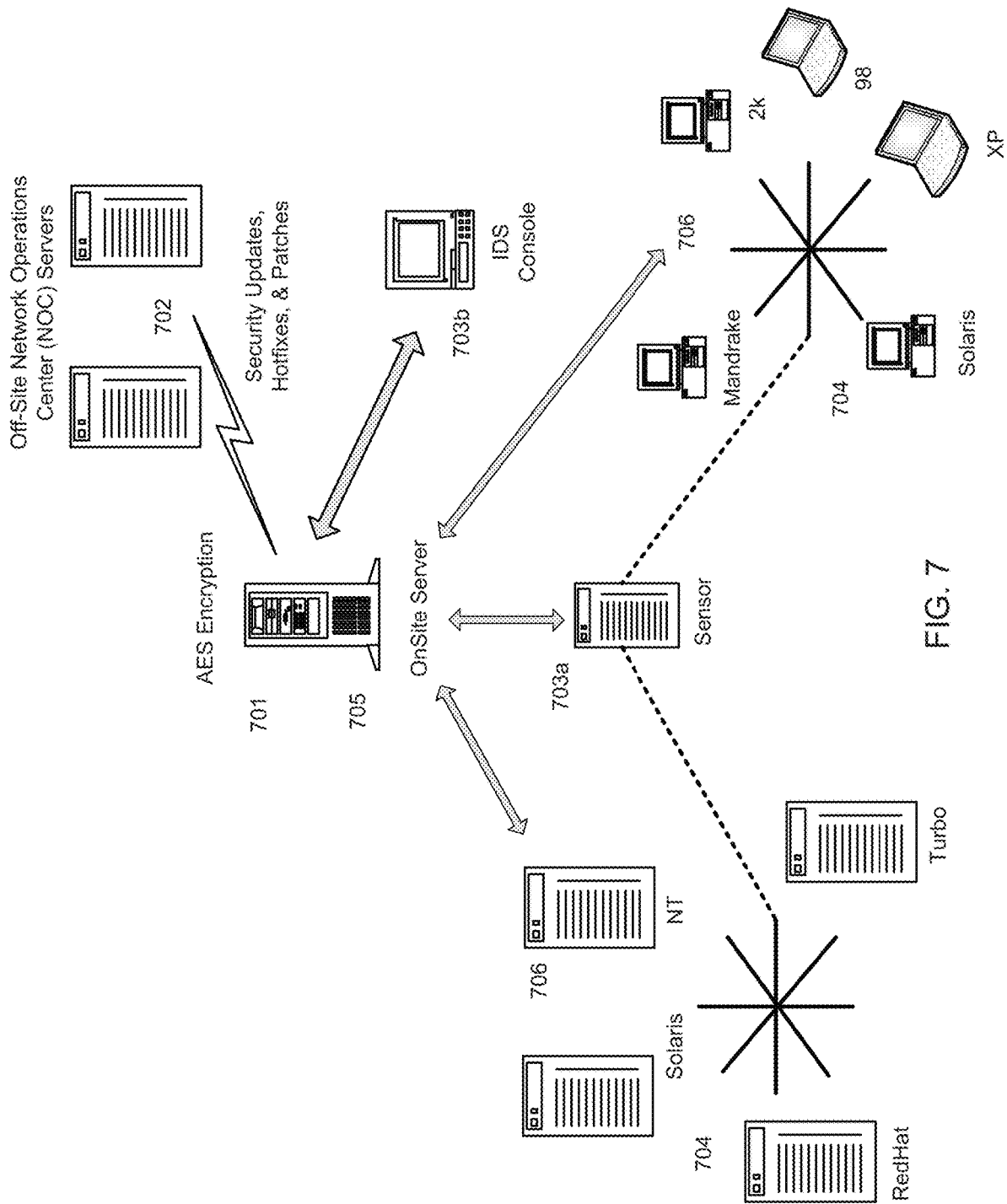
FIG. 7 illustrates an intelligent IDS, in accordance with one embodiment.

FIG. 7 illustrates an intelligent IDS, in accordance with one embodiment. As shown in 701, the on-site server periodically initiates communication with the NOC servers. In 702, updates are pulled from the NOC servers to the on-site server. In 703a, a sensor monitors and processes network traffic, and sends real time alert data to the on-site server where it cross-references the data with the backend. In 703b, centralized IDS console filters alerts; separating events from incidents. It also offers administrators remote patching function. In 704, agents are deployed to each client, accurately identifying which OS, apps, and updates are installed. In 705, the logic engine automatically determines which updates are needed to remediate the targeted machine. As shown in 706, appropriate updates are remotely deployed, installed, and validated on each client.

In one embodiment, the intelligent patch management and vulnerability remediation application automatically updates computer OS and application vulnerabilities before they can be exploited by hackers and viruses.

Networks are probed at an ever-increasing frequency for vulnerabilities, which may be exploited with directed compromise attacks. To protect the network, administrators must diligently update or "patch" server and workstation vulnerabilities, which is a time-consuming and costly process. Further compounding the burden on administrators, best practice and government compliance directives now require higher standards of network security to protect consumer privacy and proprietary data, which must be documented with change tracking and audit trail reports. Therefore, fully automated technology is provided to resolve these issues.

In one embodiment, a intelligent application called SysUpdate—the first technology to fully automate the updating and reporting processes, as described below.

In terms of function, one possible embodiment automatically researches updates. In collaboration with software development companies, it receives updates and their respective compatibility and installation guidelines, which are thoroughly reviewed and tested in a lab for system compatibility and stability. One embodiment automatically and securely downloads, and archives, all updates. Once the updates and guidelines are thoroughly reviewed and tested, they are automatically downloaded to each customer's on-site server, verified with MD5 hashes, and archived in a self-populating patch repository database.

One possible embodiment automatically determines the update and dependency requirements for all computers on a network, based on their individual operating systems, applications, and previously installed updates. The logic engine automatically matches the tested updates and their guidelines across each computer's configuration profile.

One possible embodiment remotely, securely, and automatically deploys updates to each computer and device. Updates may be tested on a test group, and then queued for release to each computer on the network, consistently in accordance with the policy determined by the network administrator.

One possible embodiment automatically verifies the updates are installed and running correctly. Each computer's client agent installs the updates, and verifies the files and hashes.

One possible embodiment automatically generates change tracking and audit trail reports. Change tracking and audit trail reports may be selected and printed from the management console reporting modules. Additionally, application license audit reports may be generated, which lists software installed on each machine, by license key.

Table 4 illustrates possible features in one embodiment.

TABLE 4

Figure 8:
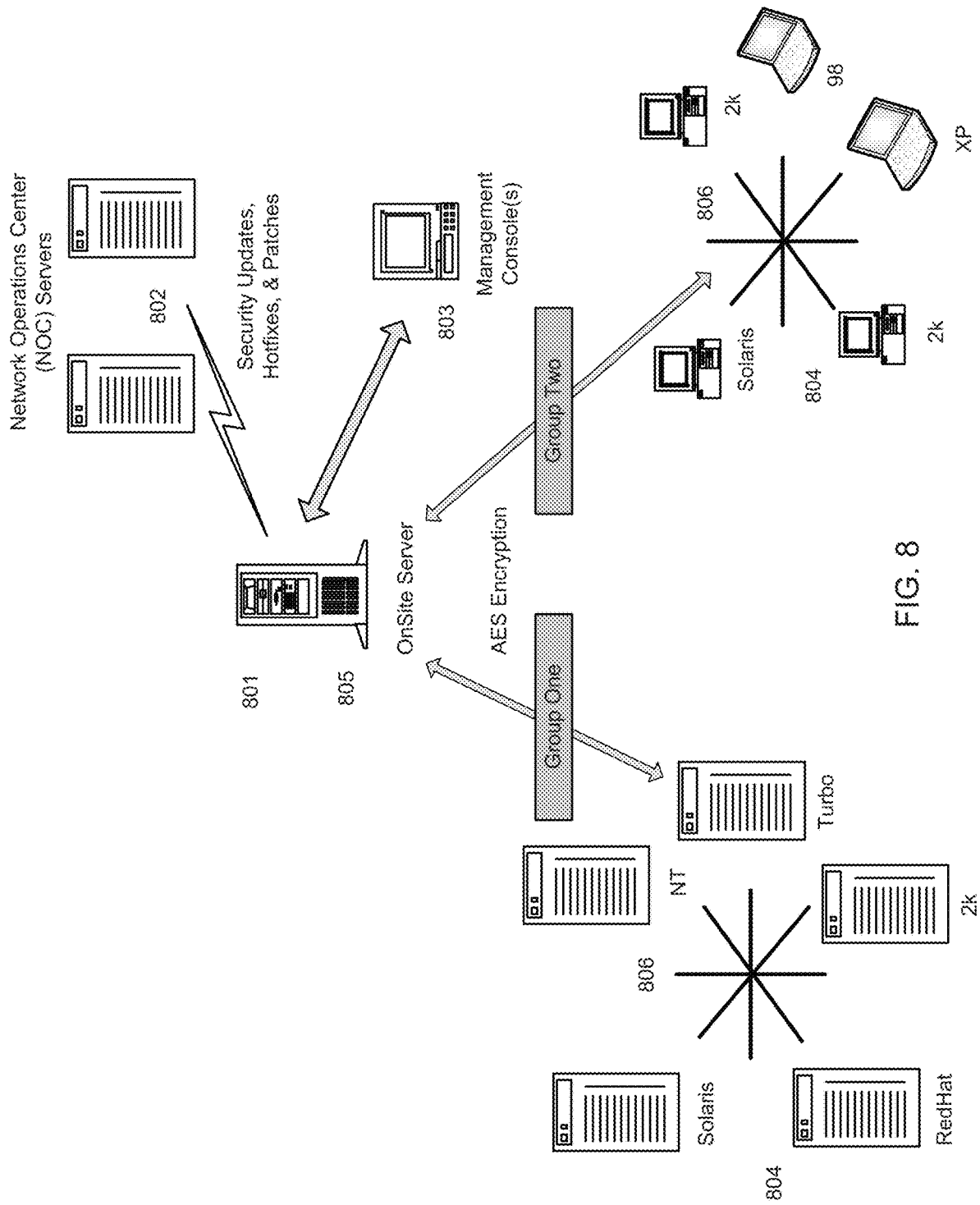
FIG. 8 illustrates an update system, in accordance with one embodiment.

Supports Windows, UNIX variants, and network devices
Supports non-Microsoft applications
Logic engine provides system intelligence
Files verified with SHA1 or MD5 hashes
MMC snap-in console with Crystal Reports
AES encryption FIG. 8 illustrates an update system, in accordance with one embodiment.

As shown in 801, the on-site server periodically initiates communication with the off-site NOC servers. In 802, updates are pulled from the NOC servers to the on-site server. In 803, the centralized MMC snap-in console offers flexible security policy options and comprehensive reporting capabilities. In 804. agents accurately identifies OS, apps, and updates installed on each client by file versions and hashes. In 805, logic engine automatically determines which updates are needed on each client, taking into account OS, app, and update dependencies. In 806, appropriate updates are automatically deployed, installed, and validated on each client.

In one embodiment, a secure computer log management application is provided with fully automated archiving, querying, and reporting options.

Best practice directives and government compliancy regulations now require administrators to archive log events over an extended period of time, and extensively document log and audit trail reports. With existing tools, these are time-consuming processes. Furthermore, existing tools transfer logs in clear text and are subject to malicious manipulation, and logs may be lost since few utilize guaranteed delivery protocols. Therefore, the integrity and security of the log data is not assured. In the event of an internal or external compromise, logs may be deleted, manipulated, or the network flooded with decoy log data.

The present possible embodiment automatically and continuously transfers logs from each computer into a self-configuring, self-populating, maintenance-free database where they may be archived for years on end. The transfer process utilizes AES encryption for authentication between the client and server, and a guarantee delivery protocol—ensuring no data is compromised or lost. Flexible cross-correlation queries may be run from a single, remote viewer console, and the data is then automatically formatted into reports.

In one embodiment, cross-correlation query type descriptions are provided. Such embodiment may provide the following three flexible cross-correlation queries in Table 5, which provide increasing detail and breadth of filtering/sorting capabilities, respectively.

TABLE 5

General Queries -This is the default query. It filters or sorts the logs of any one computer, by any one of the three log types.
Specific Queries - Detailed queries across all machines, and all log types.
Advanced Queries - Query across any combination of machines, by any combination of sources, events, and log types, over any period of time.

In one embodiment, features shown in Table 6 may be provided.

TABLE 6

Continuously pulls all logs into a central database, which may be archived for years on end
AES encryption and a guarantee delivery protocol ensure logs are not compromised or lost
Queries may be across any computer, for any log type, over any time frame
Automatically generates event log reports - ideal for documenting audit and compliance requirements
Easy download installation In one embodiment, automated reports may be provided. Query data is automatically formatted into professional reports Also, a separate reporting interface is available to generate general, machine, and user statistics. The present embodiment quickly and easily fulfills best practice and government compliance requirements for log event archiving and reporting.

Figure 9:
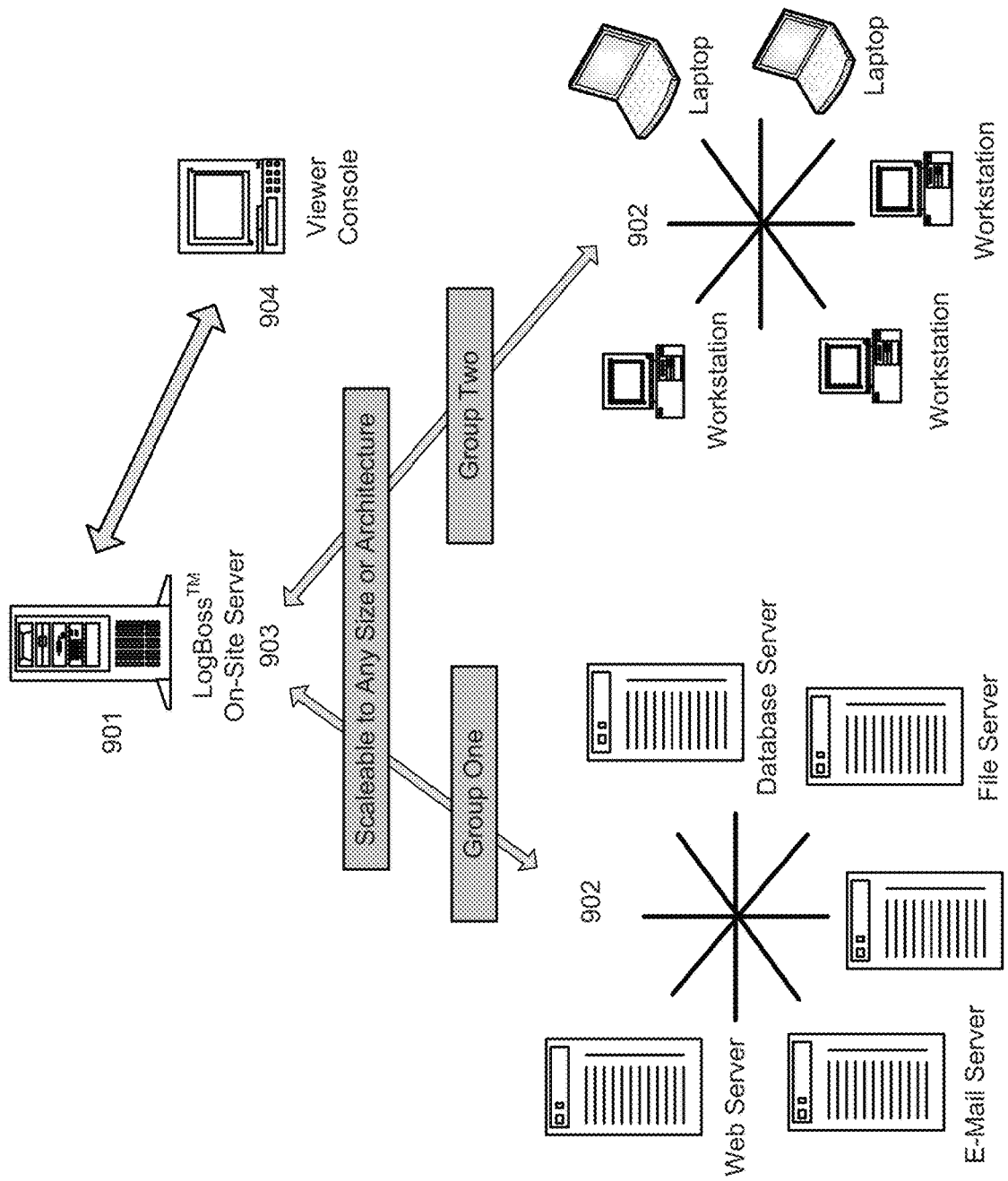
FIG. 9 shows a configured network, in accordance with one embodiment.

FIG. 9 shows a configured network, in accordance with one embodiment.

As shown in 901, the server component automatically configures the application, and the database and communicates with the client agents. In 902, client agents are deployed, which then identifies, manages, and continuously transfers all logs to the server. In 903, all client log data may be automatically archived the self-populating database, for years on end. In 904, from the centralized viewer, general, specific, or advanced cross-correlation queries may be run. See Table 7. Query and statistics data is automatically formatted into professional reports to easily document audit and compliance requirements.

TABLE 7

| Filter/Sort By: | General | Specific | Advanced |
| --- | --- | --- | --- |
| # of Computers | Any One | Any One | Any |
| # of Log Types | Any One | All | Any |
| Period of Time | Last or All | Last or All | Any |
| # of Event Detail Fields * | By ID Only | Any One | Any |

* Defined as Time/Date Written, UserID, ComputerID, EventID, Source, Type, and Category One possible embodiment provides best practice security policy templates to proactively and remotely manage and enforce enterprise security compliance policies.

Best practice and government compliance directives require higher standards of network security to protect consumer privacy and proprietary data, which must be consistently enforced, and documented with change tracking and audit trail reports for compliance verification. Therefore, a fully automated technology is provided to resolve these issues.

One embodiment offers an intelligent application to manage and enforce security policies—the first technology to fully automate the policy configuration, enforcement, and reporting processes, as described below.

In one embodiment, centralized, remote management is provided. The policy compliance and enforcement module is managed via the centralized management console—in MMC format, and automates the deployment, assessment, and enforcement of the policy chosen.

One embodiment provides standardized policies selected from many standardized policy templates recommended by NSA, SANS, US Navy, and ISO 17799, or custom policy options to formulate policies that meet the individual needs of any organization.

One possible embodiment automatically determines out-of-compliance parameters for all computers and devices on a network. Based on each client's individual policy parameter settings and configuration profile, the system's logic engine automatically reports back each client's out-of-compliance parameters.

In one embodiment, it remotely, securely, and automatically enforces policy to each computer or device. Policy changes may be automatically enforced to each computer or device individually, or by group, consistently in accordance with the policy selected by the network administrator. Policy configuration profiles are transmitted between client agent and server in an AES encrypted format for security and privacy. Policy options may be rolled back with one-click.

Automatically generates change tracking and audit trail reports. Change tracking and audit trail reports may be selected and printed from the Management Console's Reporting Center. Table 8 sets forth some possible features.

TABLE 8

Figure 10:
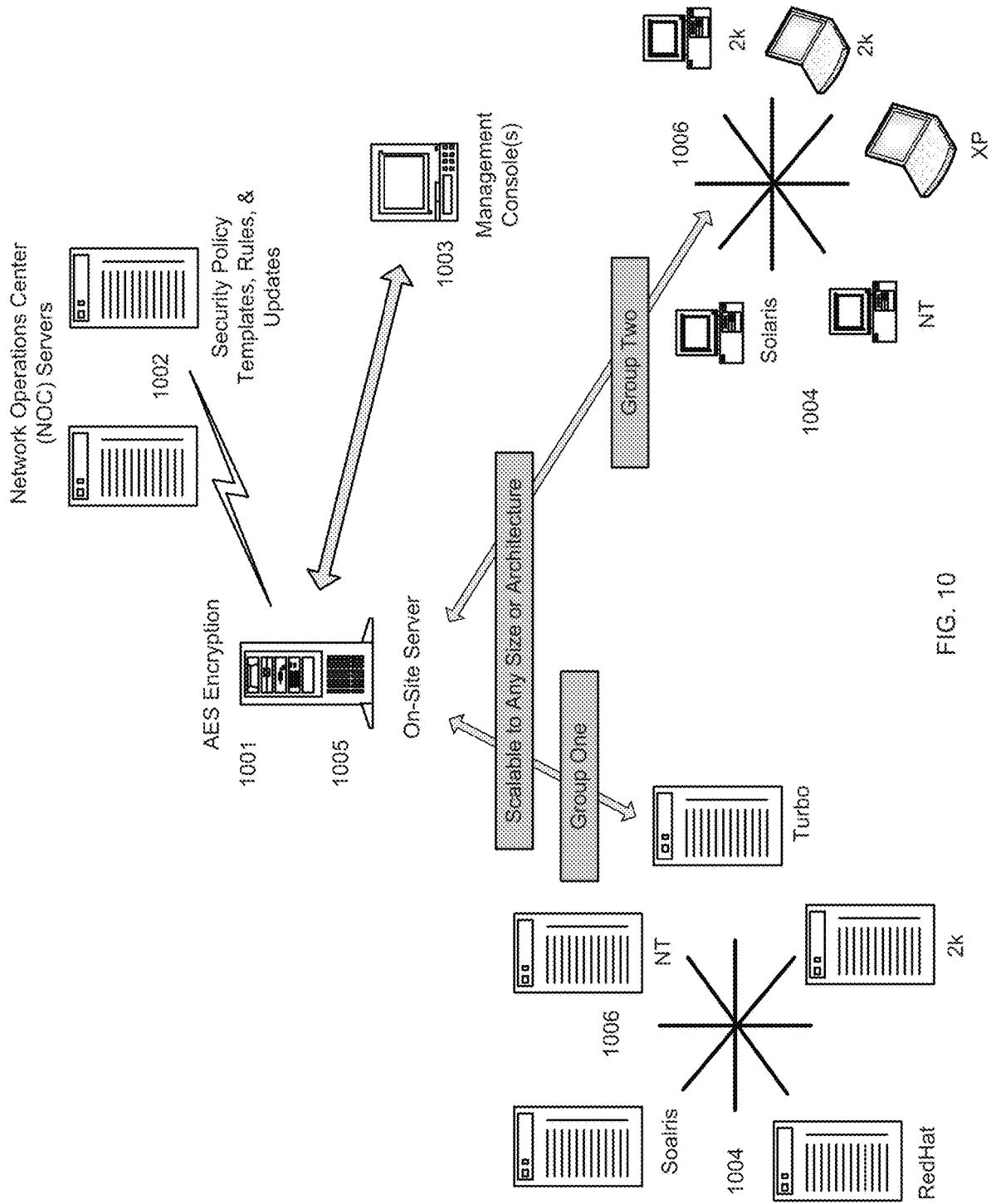
FIG. 10 shows policy compliance and enforcement, in accordance with one embodiment.

Supports Windows, UNIX variants, and network devices
Supports NSA, SANS, Navy, ISO 17799 and other standardized policies
Logic engine provides system intelligence
One-click policy rollback
Automatically generates change tracking and audit trail reports FIG. 10 shows policy compliance and enforcement, in accordance with one embodiment.

As shown in 1001, the on-site server periodically initiates communication with the off-site NOC servers. In 1002, templates, rules, and updates are pulled from the NOC servers to the on-site server. In 1003, a centralized management console offers flexible security policy templates, options, and comprehensive reporting capabilities. In 1004, agents are automatically deployed to each client, accurately identifying which policy parameters, OS, apps, and updates are applied or installed. In 1005, a logic engine automatically determines which clients are out of compliance. In 1006, appropriate policy changes are automatically enforced on each client.

In one embodiment an intelligent IPS may be provided that provides intelligence, accuracy, real-time prevention, and remote patching functions. In one embodiment, it accurately identifies and prevents malicious code from reaching their destination at the in-line IPS Sensor. Thereafter, a security officer may remotely patch the targeted vulnerability.

Conventional IDS/IPS produce an ever-increasing quantity of alert data, including erroneous and false positive data. They also lack the intelligence to identify or remediate the vulnerabilities targeted by the attack. Furthermore, the cost of the acquiring, managing, and maintaining conventional IPS is overwhelming the end user.

Therefore, a more sophisticated, intelligent technology is provided to resolve these issues, by offering an intelligent IPS to meet market requirements. The alert data output from a standard distribution of Snort is integrated with the platform via the SDK which accurately identifies attacks, and the attack is terminated at the in-line sensor—as described in the following functions.

One embodiment cross-references the threat's identifier with the target's configuration. The in-line Sensor monitors and processes traffic and sends alert data to the on-site server where its logic engine queries the backend in real-time to determine if the destination IP is vulnerable to the attack.

One possible embodiment provides enhanced flex response. If the destination IP is vulnerable to the attack, the in-line Sensor is commanded to immediately drop the exploit packets—preventing the attack. Further, it remotely remediates the vulnerability. When a machine is identified as vulnerable to an attack, an incident, a remediation function is also provided to the administrator to remotely deploy the appropriate update to the machine or device, install it, verifies the files and hashes, and documents it with change tracking and audit trail reports.

In one embodiment, attacks are accurately identified and mitigated before they reach their targets, and targeted vulnerabilities may be remotely remediated. Therefore, complex threats are more effectively and efficiently mitigated. Correspondingly, the management and maintenance burden on administrators is reduced, saving time and effort.

Table 9 illustrates some possible features.

TABLE 9

Figure 11:
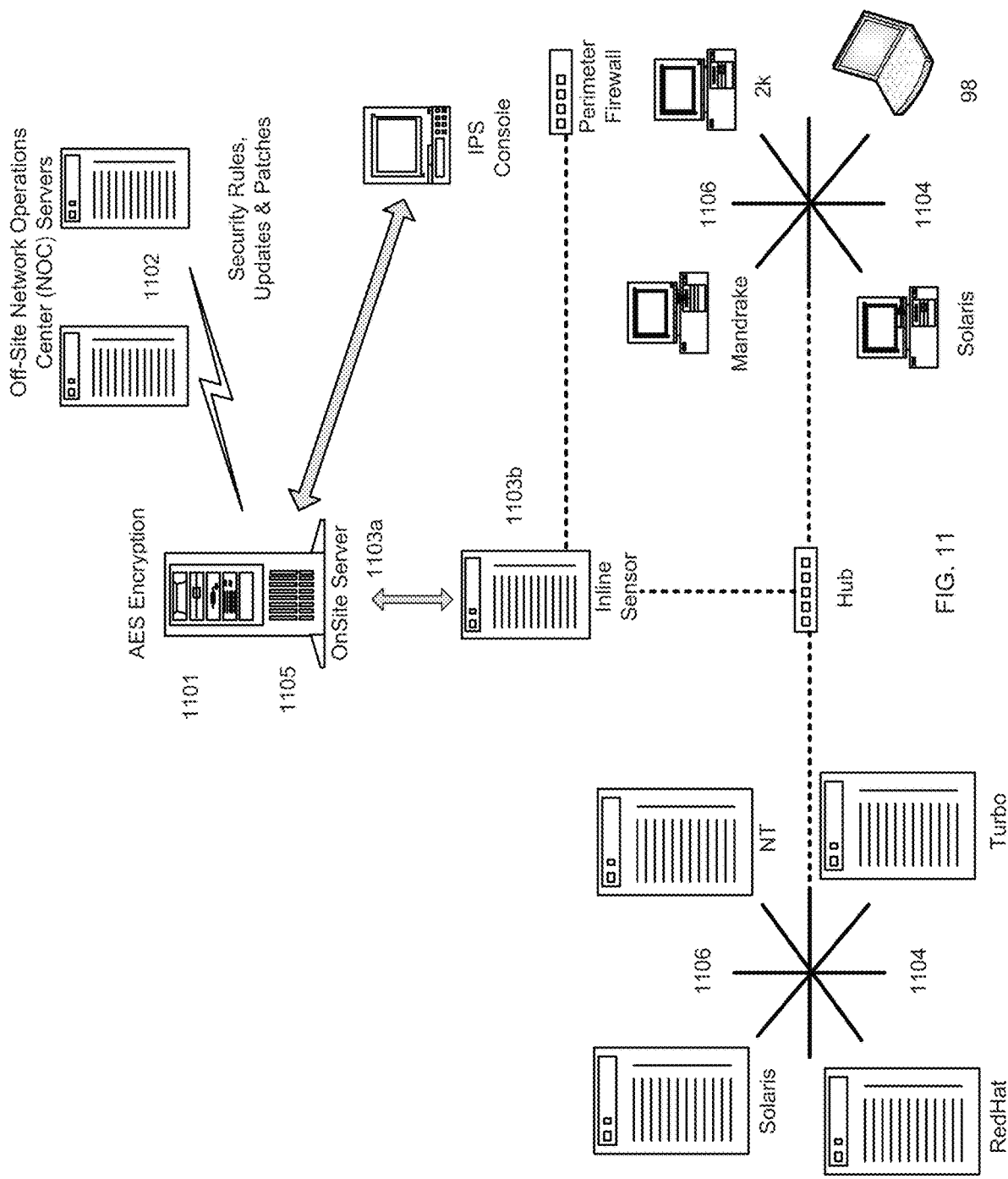
FIG. 11 illustrates an intelligent IPS, in accordance with one embodiment.

Supports Windows and UNIX variants
Determines in real-time if targeted machine is vulnerable to an attack, virtually eliminating false positives
in-line Sensor flex response terminates the attack
Remotely patches targeted vulnerabilities in one click
Installs in minutes FIG. 11 illustrates an intelligent IPS, in accordance with one embodiment.

As shown in 1101, the on-site server periodically initiates communication with the NOC servers. In 1102, updates are pulled from the NOC servers to the on-site server.

In 1103a, an IPS in-line sensor monitors and processes network traffic, and sends real time alert data to the on-site server where it cross-references the data with the backend. In 1103b, if the destination IP is vulnerable to the attack, the in-line Sensor is commanded in real-time to drop the malicious packets. As shown in 1104, agents are deployed to each client, accurately identifying which OS, apps, and updates are installed. In 1105, the logic engine automatically determines which updates are needed to remediate the targeted machine, and may be remotely deployed from the IPS console. In 1106, appropriate updates are remotely deployed, installed, and validated on each client.

In one embodiment, an anti-vulnerability SDK is provided. The SDK was designed to be a simple integration pathway to the Anti-Vulnerability platform backend. The SDK is documented and deliverable. The SDK is compatible with many different programming languages such as C, C++, VB, Java, and others.

The technology is sophisticated, yet all of the details of managing the communications are implemented in the library, requiring the developer to only learn a simple function calls as detailed hereinafter. A product architect chooses the functionality desired, inserts the provided functionality SDK code into the product code. The SDK code may then query—via the logic engine—the data warehouse, and in turn may return an answer to the point product. The architect can then show the results in any format desired in the product's interface. Full vulnerability remediation and policy compliance and enforcement functionalities may be integrated as well.

Figure 12:
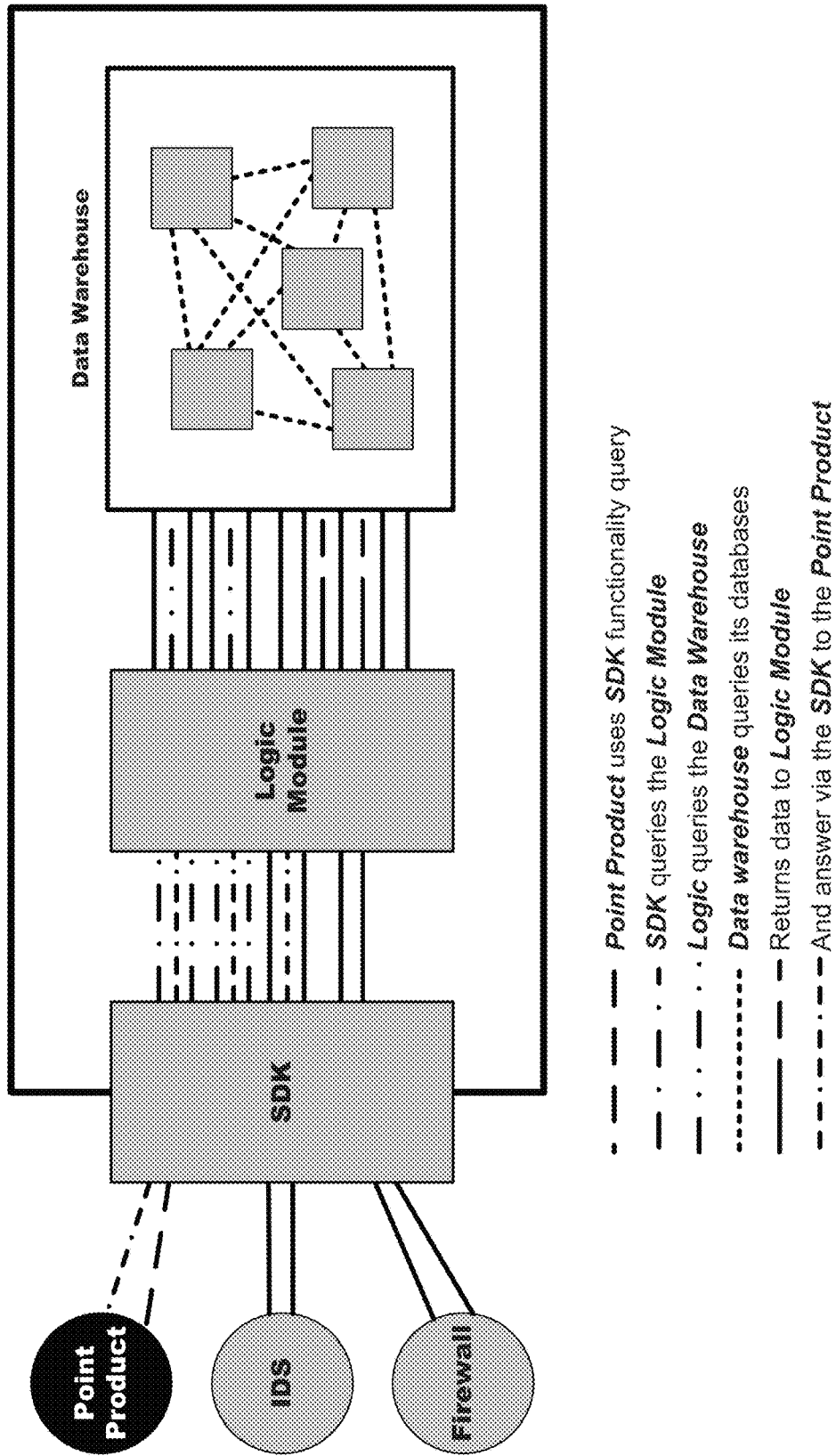
FIG. 12 illustrates an SDK function call flow, in accordance with one embodiment.

FIG. 12 illustrates an SDK function call flow, in accordance with one embodiment.

Hence, the SDK serves as the architect's tool belt or building blocks needed to quickly and transparently access the Anti-Vulnerability backend and seamlessly integrate the desired functionality into the product without changing or complicating the end user experience.

Furthermore, the SDK enables system architects to use the Anti-Vulnerability platform to integrate multiple security products and functionalities. Products may then share the same vulnerability data set, improve system automation and accuracy—increasing efficiencies and minimizing false positives and false negatives, and coordinate policy compliance and enforcement functionalities.

Anti-Vulnerability functions that are accessible via the SDK. The functions are presented in groups, as follows in Table 10.

TABLE 10

| |
| --- |
| Session Management |
| Group Management Functions |
| Client Management Functions |
| Patch Management Functions |
| Polling Functions |
| User Management Functions |
| Miscellaneous Functions |
| Policy Compliance Functions |
| Session Management Functions |

Table 11 sets forth Session Management Functions

TABLE 11

| |
| --- |
| OpenSession - Parameters: HOST name or IP address, LOGIN and PASSWORD for host |
| Returns: new SESSION |
| Description: This function opens a new session to the OnSite Server |
| CloseSession - Parameters: SESSION to close |
| Returns: None |
| Description: Closes a session that is no longer needed |
| IsSessionGood - Parameters: SESSION to test |
| Returns: TRUE or FALSE |
| Description: returns TRUE if the session is still valid FALSE if it is not |
| SUGetLastError - Parameters: None |
| Returns: Error code of last error in the thread |
| Description: Returns the error code of the last SDK error to occur in this thread |
| SUSetLastError - Parameters: ERROR code to set |
| Returns: None |
| Description: Sets the error code for the thread to be returned by SUGetLastError |
| GetSDKVersion - Parameters: None |
| Returns: a WORD containing the version of the SDK |
| Description: the MSB of the returned value is the major version number, the LSB is the minor version number |
| Ping - Parameters: SESSION to use, VALUE to ping with |
| Returns: VALUE on success 0 on failure |
| Description: attempts to pass VALUE to the OnSite Server, which should pass it back. |

Table 12 sets forth Group Management Functions.

TABLE 12

| |
| --- |
| CreateGroup - Parameters: Group NAME and Description |
| Returns: GROUP that was just created or 0 on failure |
| Description: This function creates a new group with the provided name and Description |
| GetGroups - Parameters: None |
| Returns: A LIST of GROUPs. |
| Description: This function Returns a list of all configured groups. |
| GetGroupsEx - Parameters: None |
| Returns: A LIST of GROUPINFO structures |
| Description: This function Returns a list of all configured groups' information |
| DeleteGroup - Parameters: GROUP to be deleted. |
| Returns: Success or failure |
| Description: This function permanently removes a group. |
| EditGroup - Parameters: GROUP to be edited, GROUPINFO to be applied |
| Returns: Success or failure |
| Description: This function changes a GROUP's information |
| GetGroupPolicyOSCategories - Parameters: GROUP to get information about |
| Returns: A LIST of OPERATINGSYSYTEMCATEGORYs that have group policies configured |
| Description: This function retrieves a list of operating system categories that have group policies configured |
| GetGroupPolicyOSSubCategories - Parameters: GROUP to get information about, OPERATINGSYSTEMCATEGORY to get sub category information about |
| Returns: A LIST of OPERATINGSYSTEMSUBCATEGORYs |
| Description: This function retrieves a list of operating system sub-categories of OPERATINGSYSTEMCATEGORY that have policies for the GROUP |
| GetGroupPolicyInfo - Parameters: GROUPPOLICY to get information about, GROUPPOLICYINFO pointer to receive the information |
| Returns: Success or Failure |
| Description: This function fills the passed GROUPPOLICYINFO structure with the information for the GROUPPOLICY |
| GetGroupPolicyInfoByOSCat - Parameters: GROUP to get information about, OPERATINGSYSTEMCATEGORY to get the policy for, GROUPPOLICYINFO pointer to receive the information |
| Returns: Success or failure |
| Description: This function retrieves the information for a policy for the OPERATINGSYSTEMCATEGORY in the GROUP |
| GetGroupPolicyInfoByOSSubCat - Parameters: GROUP to get information about, OPERATINGSYSTEMSUBCATEGORY to get the policy for, GROUPPOLICYINFO pointer to receive the information |
| Returns: Success or failure |
| Description: This function retrieves the information for a policy for the OPERATINGSYSTEMSUBCATEGORY in the GROUP |
| DeleteGroupPolicy - Parameters: GROUPPOLICY to delete |
| Returns: Success or failure |
| Description: This function permanently deletes the GROUPPOLICY |
| EditGroupPolicy - Parameters: GROUPPOLICYINFO with new information |
| Returns: Success or failure |
| Description: This function updates the group policy (contained in GROUPPOLICYINFO) with the information in GROUPPOLICYINFO |
| AddGroupPolicy - Parameters: GROUP to add the policy to, GROUPPOLICYINFO containg the policy information |
| Returns: Success or Failure |
| Description: This function creates a new group policy and applies it to the GROUP |
| GetClientsInGroup - Parameters: GROUP to retrieve the clients from |
| Returns: LIST of CLIENTs belonging to the group |
| Description: This function retrieves a list of clients that are members of a specific group |
| GetClientsInGroupEx - Parameters: GROUP to retrieve the clients from |
| Returns: LIST of CLIENTINFOs for clients belonging to the group |

TABLE 12-continued

Description: This function Returns a list of CLIENTINFO structures containing information for the clients that belong to this group
AddClientToGroup - Parameters: CLIENT to add to a group, GROUP to add the client to.
Returns: Success or failure
Description: This function adds a client to a group
RemoveClientFromGroup - Parameters: CLIENT to remove from group, GROUP to remove the client from
Returns: Success or failure.
Description: This function removes a client from a group.
MoveClientToGroup - Parameters: CLIENT to move, GROUP to move client to
Returns: Success or Failure
Description: This function moves CLIENT to GROUP
GetUngroupedClients - Parameters: None
Returns: LIST of ungrouped clients
Description: This function Returns a LIST of the clients that do not belong to any group
GetUngroupedClientsEx - Parameters: None
Returns: LIST of CLIENTINFO structures
Description: This function Returns a LIST of CLIENTINFO structures for the clients that do not belong to any group
GetGroupInfo - Parameters: GROUP to get information about, GROUPINFO pointer to receive the information
Returns: Success or failure
Description: This function retrieves the information for the GROUP Table 13 sets forth Client Management Functions.

TABLE 13

GetClientInstalledSoftware - Parameters: CLIENT to get information about
Returns: LIST of SOFTWARE installed on the client
Description: This function retrieves a list of the software that has been detected on the client
GetClientInstalledSoftwareEx - Parameters: CLIENT to get information about
Returns: LIST of SOFTWAREINFO for software installed on the client
Description: This function returns a LIST of SOFTWAREINFO structures describing the software detected on the client
GetClientInstalledPatches - Parameters: CLIENT to get information from.
Returns: LIST of PATCHes corresponding to the installed patches on the client
Description: This function retrieves a list of patches that were verified as installed on the last polling
GetClientInstalledPatchesEx - Parameters: CLIENT to get information from
Returns: LIST of PATCHINFO structures corresponding to the installed patches on the client
Description: This function retrieves a LIST of PATCHINFO structures for patches that were verified as installed on the last polling
GetClientPendingPatches - Parameters: CLIENT to get information from.
Returns: LIST of PATCHes corresponding to the pending patches for the client
Description: This function returns a list of patches that the client needs (according to group policy) as of the last polling.
GetClientPendingPatchesEx - Parameters: CLIENT to get information from
Returns: A LIST of PATCHINFO structures corresponding to the pending patches for the client
Description: This function returns a LIST of PATCHINFO structures for patches that the client needs (according to group policy) as of the last polling.
GetClientPendingServicePack - Parameters: CLIENT to get information from
Returns: SERVICEPACK if a service pack is pending or 0 if not
Description: This function returns a SERVICEPACK if there is a service pack pending for the client (according to group policy) as of the last polling. If there is no service pack pending it returns 0
GetClientPendingSoftware - Parameters: CLIENT to get information from

TABLE 13-continued

Returns: LIST of SOFTWARE that is pending
Description: This function returns a list of software that is pending for the client (according to group policy) as of the last polling
GetClientLogs - Parameters: CLIENT to get information from
Returns: LIST of LOGs for the client.
Description: This function returns a list of logs for a particular client.
GetClientLogsEx - Parameters: CLIENT to get information from
Returns: LIST of LOGINFO structures
Description: This function returns a list of LOGINFO structures containing log entries for a particular client.
DeleteClient - Parameters: CLIENT to delete.
Returns: Success or failure.
Description: This function removes all information pertaining to this client from the SysUpdate database.
GetClientOS - Parameters: CLIENT to get information from
Returns: OPERATINGSYSTEM installed on client
Description: This function returns the OPERATINGSYSTEM installed on the client
GetClientServicePack - Parameters: CLIENT to get information from
Returns: SERVICEPACK installed on client or 0
Description: This function returns the service pack installed on the client or 0 if the client does not have a service pack installed, or if service packs are not applicable to the client's platform
GetClientInfo - Parameters: CLIENT to get information from CLIENTINFO pointer to receive the information
Returns: Success or failure
Description: This function fills the passed CLIENTINFO structure with information pertaining to the passed CLIENT
GetClientFromIP - Parameters: IP address of client
Returns: CLIENT that corresponds to the passed IP address
Description: This function maps IP addresses to clients Table 14 sets forth Patch Management Functions.

TABLE 14

GetPatchInfo - Parameters: PATCH to get information about, PATCHINFO pointer to receive information
Returns: Success or failure
Description: This function fills the passed patch info structure with information about the passed patch
InstallPatchForClient - Parameters: CLIENT to install the patch on, PATCH to install
Returns: Success or failure
Description: This function deploys the patch to the client. Installation proceeds asynchronously
InstallPatchForGroup - Parameters: GROUP to install the patch on, PATCH to install
Returns: Success or failure
Description: This function deploys the patch to all clients in the group
InstallAllPendingForClient - Parameters: CLIENT to install patches on
Returns: Success or failure
Description: This function deploys all pending patches for a client to the client
InstallAllPendingForGroup - Parameters: GROUP to install patches on
Returns: Success or failure
Description: This function deploys all pending patches to all clients in a group
RejectPatchForClient - Parameters: CLIENT to reject patch for, PATCH to reject
Returns: Success or failure
Description: This function rejects a patch for a client. This patch will not be queued down or installed
RejectPatchForGroup - Parameters: GROUP to reject patch for, PATCH to reject
Returns: Success or failure
Description: This function rejects a patch for every client in a group. This patch will not be queued down or installed
RequeuePatchForClient - Parameters: CLIENT to requeue the patch for, PATCH to requeue
Returns: Success or failure

TABLE 14-continued

Description: This function requeues a previously rejected patch for a client
RequeuePatchForGroup - Parameters: GROUP to requeue the patch for, PATCH to requeue
Returns: Success or failure
Description: This function requeues a previously rejected patch for every client in a group
RemovePatchFromClient - Parameters: CLIENT to remove patch from, PATCH to remove
Returns: Success or failure
Description: This function will uninstall a patch from a client
RemovePatchFromGroup - Parameters: GROUP to remove patch from, PATCH to remove
Returns: Success or failure
Description: This function will uninstall a patch for every client in a group
InstallServicePackForClient - Parameters: CLIENT to install service pack on, SERVICEPACK to install on client
Returns: Success or failure
Description: This function will install a service pack on a client
InstallServicePackForGroup - Parameters: GROUP to install service pack on, SERVICEPACK to install
Returns: Success or failure
Description: This function will install a service pack on every client in a group
InstallSoftwareForClient - Parameters: CLIENT to install software update on, SOFTWARE to install
Returns: Success or failure
Description: This function will install a software update on a client
InstallSoftwareForGroup - Parameters: GROUP to install software update on, SOFTWARE to install
Returns: Success or failure
Description: This function will install a software update on every client in a group.
GetCveIDsFromPatch - Parameters: PATCH to get CveIDs from
Returns: A LIST of CVEIDs
Description: This function returns a list of CVEIDs the correspond to the PATCH Table 15 sets forth Polling Functions.

TABLE 15

PollClient - Parameters: CLIENT to poll
Returns: Success or failure.
Description: This function causes a client to be polled by the OnSite Server immediately.
PollGroup - Parameters: GROUP to poll
Returns: Success or failure.
Description: This function causes all the clients in a particular group to be polled immediately.
PollAll - Parameters: NONE
Returns: Success or failure.
Description: This function causes all clients to be polled immediately.

Table 16 sets forth User Management Functions.

TABLE 16

GetUsers - Parameters: None
Returns: A LIST of USERs
Description: This function returns a list of all users for the system
GetUserInfo - Parameters: USER to get information about, USERINFO pointer to receive the information
Returns: Success or failure
Description: This function populates the passed USERINFO structure with information about the passed USER
GetUserGroupPrivileges - Parameters: USER to get information about
Returns: A LIST of USERGROUPPRIVILEGEs
Description: This function returns a LIST of USERGROUPPRIVILEGES representing the privileges that a particular user has

TABLE 16-continued

GetUserGroupPrivilegesEx - Parameters: USER to get information about
Returns: A LIST of USERGROUPPRIVILEGEINFO structures
Description: This function returns a LIST of USERGROUPPRIVILEGEINFO structures representing the privileges that a particular user has
GetUserGroupPrivilegeInfo - Parameters: USERGROUPPRIVILEGE to get information about, USERGROUPPRIVILEGEINFO pointer to receive information
Returns: Success or failure
Description: This function populates the passed USERGROUPPRIVILEGEINFO structure with the details of the particular privilege
GetUserGroupPrivilegeInfoByGroup - Parameters: USER to get information about, tGROUP o get information for, USERGROUPPRIVILEGEINFO pointer to populate
Returns: Success or Failure
Description: This function populates the passed USERGROUPPRIVILEGEINFO structure with the detailed information regarding the permissions that the passed user has on the passed group
AddUserGroupPrivilege - Parameters: USERGROUPPRIVILEGEINFO structure to add
Returns: Success or failure
Description: This function adds a USERGROUPPRIVILEGE
EditUserGroupPrivilege - Parameters: USERGROUPPRIVILEGEINFO with new values
Returns: Success or failure
Description: This function edits the USERGROUPPRIVILEGEINFO structure passed in, assign it the new values
DeleteUserGroupPrivilege - Parameters: USERGROUPPRIVILEGE to delete
Returns: Success or failure
Description: This function deletes the passed USERGROUPPRIVILEGE from the system
AddUser - Parameters: USERNAME, PASSWORD, and USERTYPE
Returns: USER representing the user that was just created
Description: This function creates a new user with the provided username, password, and type, and returns a USER representing the new user or 0 in the case of an error
DeleteUser - Parameters: USER to delete
Returns: Success or failure
Description: This function permanently deletes the USER from the system along with any privileges the user may have had
ChangeUserPassword - Parameters: USER to change password for, new PASSWORD
Returns: Success or failure
Description: This function changes the password for a user
ChangeUserRole - Parameters: USER to change role, ROLE to change to
Returns: Success or failure
Description: This Function changes a user's role
GetUserFromName - Parameters: USERNAME
Returns: USER corresponding to the passed user name
Description: This function provides a mapping from user names to USERs Table 17 sets forth Miscellaneous Functions.

TABLE 17

CreateList - Parameters: None
Returns: A new, empty, LIST
Description: This functions creates a new LIST that is initially empty
GetListItemEx - Parameters: LIST to retrieve item from, INDEX of item to retrieve, VOID pointer to receive item
Returns: Success or failure
Description: This function populates the memory pointed to by VOID with the contents of the LIST item at INDEX
GetListSize - Parameters: LIST to get the size of
Returns: the size of the LIST
Description: This function returns the number of elements currently in the list
AddItemToList - pointer to LIST to add the item to, LONG item to add TABLE 17-continued Returns: None
Description: This function adds an "item" (such as a GROUP or a CLIENT) to a LIST
AddClientInfoExToList - See AddItemToList
AddGroupInfoExToList - See AddItemToList
AddPatchInfoExToList - See AddItemToList
AddSoftwareInfoToList - See AddItemToList
AddSoftwareCategoryInfoToList - See AddItemToList
AddUserGroupPrivilegeInfoExToList - See AddItemToList
RemoveItemFromList - Parameters: pointer to LIST to remove the item from, INDEX of item to remove
Returns: None
Description: This function removes the item at INDEX from the LIST
FreeList - LIST to deallocate
Returns: None
Description: This function deallocates the resources used by LIST
GetSoftwareInfo - Parameters: SOFTWARE to get information for, SOFTWAREINFO pointer to hold the information
Returns: Success or failure
Description: This function populates the SOFTWAREINFO structure pointed at with information regarding the SOFTWARE
GetLogInfo - Parameters: LOG to get information about, LOGINFO pointer to contain the information
Returns: Success or failure
Description: This function populates the LOGINFO structure pointed at with information regarding the LOG
GetSoftwareCategories - Parameters: None
Returns: A LIST of SOFTWARECATEGORYs
Description: This function returns a LIST of SOFTWARECATEGORYs
GetSoftwareCategoriesEx - Parameters: None
Returns: A LIST of SOFTWARECATEGORYINFO structures
Description: This function returns LIST of SOFTWARECATEGORYINFO structures for every software category known on the system
GetSoftwareCategoriesForOperatingSystemCategory - Parameters: an OPERATINGSYSTEMCATEGORY to get information for
Returns: A LIST of SOFTWARECATEGORYs
Description: This function returns a LIST of software categories for the passed operating system category.
GetSoftwareCategoriesForOperatingSystemCategoryEx - As above only, returning the appropriate "info" structures in the list
GetSoftwareCategoryInfo - Parameters: SOFTWARECATEGORY to get information for, SOFTWARECATEGORYIFNO pointer to contain the information
Returns: Success or failure Table 18 sets forth Policy Compliance Functions.

These functions are provided in a separate source tree (policy tree) for the Policy Compliance and Enforcement module. Function include: Password/system access policies, log configurations, audit settings, user/group privilege rights, general service settings, service permissions, registry values, registry permissions, file permissions. It can also perform deltas on and get information about: groups, users, services, and all the "Run" registry keys.

The function calls are being integrated into the live production tree and subject to change.

TABLE 18

GetPolicyItemInfo - As GetOperatingSystemInfo for POLICYITEM and POLICYITEMINFO
InstallPolicyItemForClient - As InstallPatchForClient for POLICYITEM
InstallPolicyItemForGroup - As InstallPatchForGroup for POLICYITEM
InstallAllPendingPolicyItemsForClient - As InstallAllPendingPatchesForClient for POLICYITEM
InstallAllPendingPolicyItemsForGroup - As InstallAllPendingPatchesForGroup for POLICYITEM TABLE 18-continued RemovePolicyItemFromClient - As RemovePatchForClient for POLICYITEM
RemovePolicyItemFromGroup - As RemovePatchFromGroup for POLICYITEM All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A non-transitory computer-readable media storing instructions that, when executed by one or more processors, cause the one or more processors to:
receive first vulnerability information from at least one first data storage that is generated utilizing second vulnerability information from at least one second data storage that is used to identify a plurality of potential vulnerabilities;
said first vulnerability information generated utilizing the second vulnerability information, by:
identifying at least one configuration associated with a plurality of devices including a first device, a second device, and a third device, and
determining that the plurality of devices is vulnerable to at least one accurately identified vulnerability based on the identified at least one configuration, utilizing the second vulnerability information that is used to identify the plurality of potential vulnerabilities;
identify an occurrence in connection with at least one of the plurality of devices, utilizing one or more network monitors;
based on a packet analysis, determine that the at least one accurately identified vulnerability of the at least one of the plurality of devices is susceptible to being taken advantage of by the occurrence identified in connection with the at least one of the plurality of devices, utilizing the first vulnerability information; and
allow selective utilization of different occurrence mitigation actions of diverse occurrence mitigation types, including a firewall-based occurrence mitigation type and an intrusion prevention system-based occurrence mitigation type, across the plurality of devices for occurrence mitigation by preventing advantage being taken of accurately identified vulnerabilities utilizing the different occurrence mitigation actions of the diverse occurrence mitigation types across the plurality of devices;
wherein the at least one configuration involves at least one operating system.

2. The non-transitory computer-readable media of claim 1, wherein the instructions are configured for providing at least two options via a user interface including a firewall-type option for preventing at least one occurrence packet, and an intrusion prevention-type option for preventing a connection request; the instructions are configured such that, in response to user input received prior to receipt of the at least one occurrence packet, the firewall-type option is applied to the plurality of devices by sending a first signal over at least one network to at least one first component with firewall-type functionality such that the at least one occurrence packet is prevented across the plurality of devices; and the instructions are configured such that, in response to additional user input after the receipt of the at least one occurrence packet in connection with a particular single device of the plurality of devices, the intrusion prevention-type option is applied to the particular single device by sending a second signal over the at least one network to at least one second component with intrusion prevention-type functionality such that the connection request is prevented at the particular single device.

3. The non-transitory computer-readable media of claim 1, wherein the instructions are configured such that at least two options are provided including a firewall-type option, and an intrusion prevention-type option for preventing a connection request; the instructions are configured such that, in response to user input prior to receipt of at least one occurrence packet, the intrusion prevention-type option is applied to the plurality of devices for preventing the connection request across the plurality of devices after the receipt of the at least one occurrence packet; and the instructions are configured such that, in response to user input after the receipt of the at least one occurrence packet in connection with a particular single device of the plurality of devices, the firewall-type option is applied to the particular single device.

4. The non-transitory computer-readable media of claim 1, wherein the instructions are configured such that the at least one accurately identified vulnerability is determined as a function of the at least one operating system, so that, in order to avoid false positives, only relevant vulnerabilities prompt user selection among the different occurrence mitigation actions of the diverse occurrence mitigation types in connection therewith.

5. A non-transitory computer-readable media storing instructions that, when executed by one or more processors, cause the one or more processors to:
receive first vulnerability information from at least one first data storage that is generated utilizing second vulnerability information from at least one second data storage that is used to identify a plurality of potential vulnerabilities;
said first vulnerability information generated utilizing the second vulnerability information, by:
identifying at least one configuration associated with a plurality of devices including a first device, a second device, and a third device, and
determining that the plurality of devices is vulnerable to at least one accurately identified vulnerability based on the identified at least one configuration, utilizing the second vulnerability information that is used to identify the plurality of potential vulnerabilities;
identify an occurrence in connection with at least one of the plurality of devices, utilizing one or more monitors;
based on a packet analysis, determine that the at least one accurately identified vulnerability of the at least one of the plurality of devices is susceptible to being taken advantage of by the occurrence identified in connection with the at least one of the plurality of devices, utilizing the first vulnerability information; and
permit selective utilization of different occurrence mitigation actions of diverse occurrence mitigation types, including a firewall-based occurrence mitigation type and an intrusion prevention system-based occurrence mitigation type, across the plurality of devices for occurrence mitigation by preventing advantage being taken of accurately identified vulnerabilities utilizing the different occurrence mitigation actions of the diverse occurrence mitigation types across the plurality of devices;
wherein the at least one configuration involves at least one operating system.

6. The non-transitory computer-readable media of claim 5, wherein the instructions are configured such that the utilization of the different occurrence mitigation actions is selectively permitted for different devices prior to the occurrence, resulting in: the utilization of only a first occurrence mitigation action of the firewall-based occurrence mitigation type being selectively permitted at the first device in response to the occurrence, the utilization of only a second occurrence mitigation action of the intrusion prevention system-based occurrence mitigation type being selectively permitted at the second device in response to the occurrence, and the utilization of both the first occurrence mitigation action and the second occurrence mitigation action being selectively permitted at the third device in response to the occurrence.

7. The non-transitory computer-readable media of claim 5, wherein the instructions, when executed by the one or more processors, cause the one or more processors to:
receive a first user input;
based on the first user input, automatically apply a first one of the different occurrence mitigation actions of the firewall-based occurrence mitigation type;
receive a second user input; and
based on the second user input, automatically apply a second one of the different occurrence mitigation actions of the intrusion prevention system-based occurrence mitigation type.

8. The non-transitory computer-readable media of claim 5, wherein the instructions are configured such that different user input is permitted to be received prior to the occurrence for different devices, for allowing completion of the different occurrence mitigation actions, in a manner that the different user input results in: only a first occurrence mitigation action of the firewall-based occurrence mitigation type being user-selectively completed at the first device in response to the occurrence, only a second occurrence mitigation action of the intrusion prevention system-based occurrence mitigation type being user-selectively completed at the second device in response to the occurrence, and both the first occurrence mitigation action and the second occurrence mitigation action being user-selectively completed at the third device in response to the occurrence.

9. The non-transitory computer-readable media of claim 5, wherein the instructions, when executed by the one or more processors, cause the one or more processors to:
display at least two options for selecting the different occurrence mitigation actions, utilizing at least one user interface;
receive a first user input selecting a first one of the options, utilizing the at least one user interface;
based on the first user input, automatically apply a first one of the different occurrence mitigation actions of the firewall-based occurrence mitigation type;
receive a second user input selecting a second one of the options, utilizing the at least one user interface; and
based on the second user input, automatically apply a second one of the different occurrence mitigation actions of the intrusion prevention system-based occurrence mitigation type.

10. A non-transitory computer-readable media storing instructions that, when executed by one or more processors, cause the one or more processors to:
- receive first vulnerability information from at least one first data storage that is generated utilizing second vulnerability information from at least one second data storage that is used to identify a plurality of potential vulnerabilities;
- said first vulnerability information generated utilizing the second vulnerability information, by:
  - identifying at least one configuration associated with a plurality of devices including a first device, a second device, and a third device, and
  - determining that the plurality of devices is vulnerable to at least one accurately identified vulnerability based on the identified at least one configuration, utilizing the second vulnerability information that is used to identify the plurality of potential vulnerabilities;
- display information that is based on the first vulnerability information;
- cause utilization of different occurrence mitigation actions of diverse occurrence mitigation types, including a firewall-based occurrence mitigation type and an intrusion mitigation system-based occurrence mitigation type, across the plurality of devices for occurrence mitigation by preventing advantage being taken of accurately identified vulnerabilities utilizing the different occurrence mitigation actions of the diverse occurrence mitigation types across the plurality of devices; and
- receive an indication that an occurrence has been identified in connection with at least one of the plurality of devices utilizing one or more monitors;
- wherein the at least one configuration involves at least one operating system.

11. The non-transitory computer-readable media of claim 10, wherein the instructions are configured such that the utilization of the different occurrence mitigation actions is caused for different devices prior to the occurrence.

12. The non-transitory computer-readable media of claim 10, wherein the instructions are configured such that the utilization of the different occurrence mitigation actions is caused for different devices prior to the occurrence, resulting in: the utilization of only a first occurrence mitigation action of the firewall-based occurrence mitigation type being caused at the first device in response to the occurrence, the utilization of only a second occurrence mitigation action of the intrusion mitigation system-based occurrence mitigation type being caused at the second device in response to the occurrence, and the utilization of both the first occurrence mitigation action and the second occurrence mitigation action being caused at the third device in response to the occurrence.

13. The non-transitory computer-readable media of claim 10, wherein the instructions, when executed by the one or more processors, cause the one or more processors to:
- receive a first user input;
- based on the first user input, automatically apply a first one of the different occurrence mitigation actions of the firewall-based occurrence mitigation type;
- receive a second user input; and
- based on the second user input, automatically apply a second one of the different occurrence mitigation actions of the intrusion mitigation system-based occurrence mitigation type.

14. The non-transitory computer-readable media of claim 10, wherein the instructions are configured such that different user input is permitted to be received prior to the occurrence for different devices, for allowing completion of the different occurrence mitigation actions, in a manner that the different user input results in: only a first occurrence mitigation action of the firewall-based occurrence mitigation type being user-completed at the first device in response to the occurrence, only a second occurrence mitigation action of the intrusion mitigation system-based occurrence mitigation type being completed at the second device in response to the occurrence, and both the first occurrence mitigation action and the second occurrence mitigation action being completed at the third device in response to the occurrence.

15. The non-transitory computer-readable media of claim 10, wherein the instructions, when executed by the one or more processors, cause the one or more processors to:
- display at least two options for selecting the different occurrence mitigation actions, utilizing at least one user interface;
- receive a first user input selecting a first one of the options, utilizing the at least one user interface;
- based on the first user input, automatically apply a first one of the different occurrence mitigation actions of the firewall-based occurrence mitigation type;
- receive a second user input selecting a second one of the options, utilizing the at least one user interface; and
- based on the second user input, automatically apply a second one of the different occurrence mitigation actions of the intrusion mitigation system-based occurrence mitigation type.

16. The non-transitory computer-readable media of claim 10, wherein the intrusion mitigation system-based occurrence mitigation type includes at least one of an intrusion prevention system-based occurrence mitigation type or an intrusion detection system-based occurrence mitigation type, and the information includes a recommendation.

17. The non-transitory computer-readable media of claim 5, wherein the instructions are configured such that the utilization of the different occurrence mitigation actions is selectively permitted for different devices prior to the occurrence.

18. The non-transitory computer-readable media of claim 1, wherein the instructions are configured such that which of the different occurrence mitigation actions for which one or more options are provided to a user, is based on one or more of the actual vulnerabilities to which the plurality of devices is actually vulnerable so that only relevant occurrence mitigation actions are available for selection by the user.

19. The non-transitory computer-readable media of claim 1, wherein the instructions are configured such that the at least one accurately identified vulnerability is determined as a function of the at least one operating system and at least one some of the different occurrence mitigation actions are specific to the at least one accurately identified vulnerability.

20. The non-transitory computer-readable media of claim 1, wherein the instructions are configured such that different user input is allowed to be received prior to the occurrence for different devices, for allowing completion of the different occurrence mitigation actions, in a manner that the different user input results in: only a first occurrence mitigation action of the firewall-based occurrence mitigation type being user-selectively completed at the first device in response to the occurrence, only a second occurrence mitigation action of the intrusion prevention system-based occurrence mitigation type being user-selectively completed at the second device in response to the occurrence, and both the first occurrence mitigation action and the second occurrence mitigation action being user-selectively completed at the third device in response to the occurrence.

21. The non-transitory computer-readable media of claim 20, wherein the instructions are configured such that additional user input is permitted to be received after a reporting of the occurrence, for causing completion of the different occurrence mitigation actions, in a manner that the additional user input results in: the first occurrence mitigation action of the firewall-based occurrence mitigation type being supplemented by the second occurrence mitigation action of the intrusion prevention system-based occurrence mitigation type at the first device.

22. The non-transitory computer-readable media of claim 20, wherein the instructions are configured such that additional user input is permitted to be received after a reporting of the occurrence, for prompting a rollback of one or more of the different occurrence mitigation actions, in a manner that the additional user input results in: the second occurrence mitigation action of the intrusion prevention system-based occurrence mitigation type being rolled back at the third device.

23. The non-transitory computer-readable media of claim 1, wherein the instructions are configured such that one or more options are provided to a user so that the user is permitted to select each of the different occurrence mitigation actions of the diverse occurrence mitigation types in connection with the at least one accurately identified vulnerability which includes a single actual vulnerability, such that both of the different occurrence mitigation actions are associated with the single actual vulnerability.

24. The non-transitory computer-readable media of claim 1, wherein the instructions, when executed by the one or more processors, cause the one or more processors to:
determine the occurrence to have a first severity if it is determined that the at least one accurately identified vulnerability of the at least one of the plurality of devices is susceptible to being taken advantage of by the occurrence;
determine the occurrence to have a second severity if it determined that the at least one accurately identified vulnerability of the at least one of the plurality of devices is not susceptible to being taken advantage of by the occurrence; and
report the occurrence differently based on whether the occurrence is determined to have the first severity or the second severity.

25. The non-transitory computer-readable media of claim 1, wherein the instructions are configured such that the different occurrence mitigation actions of the diverse occurrence mitigation types include: a first occurrence mitigation action of the firewall-based occurrence mitigation type including at least one of setting a configuration option, setting of a policy, or an installation of a patch; and a second occurrence mitigation action of the intrusion prevention system-based occurrence mitigation type including at least one of setting the configuration option, the setting of the policy, or the installation of the patch that is different than that included in connection with the first occurrence mitigation action.

26. The non-transitory computer-readable media of claim 1, wherein the instructions are configured such that multiple options for selecting the different occurrence mitigation actions are displayed via an intrusion prevention system interface of an intrusion prevention system that is supported by a single client agent that supports at least one aspect of the identifying the occurrence, at least one aspect of automatically completing a first one of the different occurrence mitigation actions of the firewall-based occurrence mitigation type in response to a selection of a first one of the multiple options, and at least one aspect of automatically completing a second one of the different occurrence mitigation actions of the intrusion prevention system-based occurrence mitigation type in response to a selection of a second one of the multiple options.

27. The non-transitory computer-readable media of claim 1, wherein the instructions, when executed by the one or more processors, cause the one or more processors to:
display at least two options for selecting the different occurrence mitigation actions, utilizing at least one user interface;
receive a first user input selecting a first one of the options, utilizing the at least one user interface;
based on the first user input, automatically apply a first one of the different occurrence mitigation actions of the firewall-based occurrence mitigation type;
receive a second user input selecting a second one of the options, utilizing the at least one user interface; and
based on the second user input, automatically apply a second one of the different occurrence mitigation actions of the intrusion prevention system-based occurrence mitigation type.

28. The non-transitory computer-readable media of claim 27, wherein the instructions are configured such that the automatic application of the first one of the different occurrence mitigation actions of the firewall-based occurrence mitigation type includes sending a first signal to at least one component with firewall functionality; and the automatic application of the second one of the different occurrence mitigation actions of the intrusion prevention system-based occurrence mitigation type includes sending a second signal to at least one component with intrusion prevention system functionality.

29. The non-transitory computer-readable media of claim 1, wherein the instructions are configured such that the different occurrence mitigation actions of the diverse occurrence mitigation types are automatically applied to different occurrences with different severities in real-time in response to the identification of the different occurrences based on a user selection of one or more options for selecting among the different occurrence mitigation actions before the identification of the different occurrences.

30. The non-transitory computer-readable media of claim 1, wherein the instructions, when executed by the one or more processors, cause the one or more processors to:
based on user input, automatically block the occurrence, to prevent an attack from taking advantage of the at least one accurately identified vulnerability while there is no installation of a patch that removes the at least one accurately identified vulnerability.

31. The non-transitory computer-readable media of claim 1, wherein the identifying the occurrence is accomplished by: identifying at least one first occurrence packet of a first occurrence directed to the first device, and identifying at least one second occurrence packet of a second occurrence directed to the second device; the determining that the at least one accurately identified vulnerability of the at least one of the plurality of devices is susceptible is accomplished by: identifying at least one aspect of the at least one first occurrence packet and utilizing the at least one aspect of the at least one first occurrence packet to determine whether a first actual vulnerability of the first device identified by the first vulnerability information is configured so as to be taken advantage of by the at least one first occurrence packet, and identifying at least one aspect of the at least one second occurrence packet and utilizing the at least one aspect of the at least one second occurrence packet to determine whether a second actual vulnerability of the second device identified by the first vulnerability information is configured so as to be taken advantage of by the at least one second occurrence packet; and the allowing the selective utilization of the different occurrence mitigation actions includes sending one or more control signals in response to receiving user input via a graphical user interface; wherein the instructions are configured such that, based on the user input, a first occurrence mitigation action of the different occurrence mitigation actions of the firewall-based occurrence mitigation type is completed by sending a first signal over at least one network to a first component with a firewall type functionality and preventing the first occurrence including the at least one first occurrence packet from taking advantage of the first actual vulnerability in connection with the first device; and wherein the instructions are configured such that a second occurrence mitigation action of the different occurrence mitigation actions of the intrusion prevention system-based occurrence mitigation type is completed by sending a second signal to a second component with an intrusion prevention system type functionality and preventing the second occurrence including the at least one second occurrence packet, in automatic response thereto, from taking advantage of the second actual vulnerability in connection with the second device.

32. The non-transitory computer-readable media of claim 31, wherein the instructions are configured such that at least one of:

said at least one first data storage includes at least one first database;

said at least one second data storage includes at least one second database;

said second vulnerability information is received from the at least one second data storage by at least one of:

receiving at least one update therefrom; pulling at least one update therefrom, communicating therewith, or synchronizing therewith;

said first vulnerability information is generated via a vulnerability scan operation;

said first device, said second device, and said third device are part of the same group;

said at least one configuration includes at least one of configuration data, configuration information, or a configuration status;

said at least one configuration includes at least one of a configuration option, a policy setting, or a patch;

said at least one configuration is identified via user input in connection with at least one setting;

said occurrence mitigation by preventing advantage being taken includes at least one of removing the at least one accurately identified vulnerability, or reducing an effect of any occurrence that takes advantage of the at least one accurately identified vulnerability;

said firewall-based occurrence mitigation type includes at least one of: a type that mitigates the occurrence utilizing firewall functionality, or a type that mitigates the occurrence utilizing a firewall;

said intrusion prevention system-based occurrence mitigation type includes at least one of: a type that mitigates the occurrence utilizing intrusion prevention system functionality, or a type that mitigates the occurrence utilizing an intrusion prevention system;

said different occurrence mitigation actions of the diverse occurrence mitigation types are selectively utilized across the plurality of devices to mitigate the occurrence by preventing the occurrence from taking advantage of the at least one accurately identified vulnerability after the occurrence;

said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;

said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;

said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one accurately identified vulnerability in connection with at least one of the plurality of devices;

said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;

said at least one accurately identified vulnerability includes the at least one operating system;

said actual vulnerabilities include the at least one accurately identified vulnerability;

said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one accurately identified vulnerability which includes the at least one operating system and utilizing a second one of the different occurrence mitigation actions for a second aspect of the at least one operating system;

one or more of said different occurrence mitigation actions is caused after the occurrence to selectively utilize the different occurrence mitigation actions of the diverse occurrence mitigation types;

one or more of said different occurrence mitigation actions is caused before the occurrence to selectively utilize the different occurrence mitigation actions of the diverse occurrence mitigation types;

said different occurrence mitigation actions include different remediation actions;

said different occurrence mitigation actions of the diverse occurrence mitigation types utilized at the plurality of devices include the same set of said different occurrence mitigation actions;

said occurrence includes at least one of a request, traffic, at least one packet, or a potential attack;

said at least one aspect of the at least one first occurrence packet involves at least one of a payload thereof or an IP address;

said at least one aspect of the at least one first occurrence packet is utilized to determine whether the first actual vulnerability of the first device identified by the first vulnerability information is configured so as to be taken advantage of by the at least one first occurrence packet, by utilizing the at least one aspect in connection with at least one of a cross-referencing operation or a look-up operation;

said user input includes separate user input for selecting the first occurrence mitigation action and the second occurrence mitigation action;

said first signal and the second signal include at least one of response signals, or signals sent in response to a query signal;

said first component with the firewall type functionality includes at least one of a firewall, a gateway with the firewall type functionality, a router with the firewall type functionality, a sensor with the firewall type functionality, or a multiple-security product system with the firewall type functionality;

said second component with the intrusion prevention system type functionality includes at least one of an intrusion prevention system, an intrusion detection system with the intrusion prevention system type functionality, a gateway with the intrusion prevention system type functionality, a router with the intrusion prevention system type functionality, a sensor with the intrusion prevention system type functionality, or a multiple-security product system with the intrusion prevention system type functionality;

said preventing includes at least one of rejecting a request, disallowing an attempt, dropping at least one packet, blocking a potential attack, redirecting a request, setting a policy, affecting a service, changing a configuration option, or installing a patch; or said automatic response includes a real-time response.

33. The non-transitory computer-readable media of claim 1, wherein the instructions are configured such that each of:

said at least one first data storage includes at least one first database;

said at least one second data storage includes at least one second database;

said second vulnerability information is received from the at least one second data storage by at least one of: receiving at least one update therefrom; pulling at least one update therefrom, communicating therewith, or synchronizing therewith;

said first vulnerability information is generated via a vulnerability scan operation;

said first vulnerability information identifies at least one actual vulnerability;

said first vulnerability information includes at least one of a vulnerability identifier or information associated with one or more of the actual vulnerabilities;

said first device, said second device, and said third device are part of the same group;

said at least one configuration includes at least one of configuration data, configuration information, or a configuration status;

said at least one configuration includes at least one of a configuration option, a policy setting, or a patch;

said at least one configuration is utilized for identifying the at least one operating system or an application;

said at least one configuration is identified utilizing information regarding the at least one operating system or an application;

said at least one configuration is identified via user input in connection with at least one setting;

said occurrence mitigation includes at least one of removing the at least one accurately identified vulnerability, or reducing an effect of any occurrence that takes advantage of the at least one accurately identified vulnerability;

said firewall-based occurrence mitigation type includes at least one of: a type that mitigates the occurrence utilizing firewall functionality, or a type that mitigates the occurrence utilizing a firewall;

said intrusion prevention system-based occurrence mitigation type includes at least one of: a type that mitigates the occurrence utilizing intrusion prevention system functionality, or a type that mitigates the occurrence utilizing an intrusion prevention system;

said different occurrence mitigation actions of the diverse occurrence mitigation types are selectively utilized across the plurality of devices to mitigate the occurrence by preventing the occurrence from taking advantage of the at least one accurately identified vulnerability after the occurrence;

said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;

said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;

said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one accurately identified vulnerability in connection with at least one of the plurality of devices;

said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;

said at least one actual vulnerability is the at least one operating system;

said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one accurately identified vulnerability which is the at least one operating system and utilizing a second one of the different occurrence mitigation actions for a second aspect of the at least one operating system;

one or more of said different occurrence mitigation actions is caused after the occurrence to selectively utilize the different occurrence mitigation actions of the diverse occurrence mitigation types;

one or more of said different occurrence mitigation actions is caused before the occurrence to selectively utilize the different occurrence mitigation actions of the diverse occurrence mitigation types;

said different occurrence mitigation actions include different remediation actions;

said different occurrence mitigation actions of the diverse occurrence mitigation types utilized at the plurality of devices include the same set of said different occurrence mitigation actions;

said occurrence includes at least one of a request, traffic, at least one packet, or a potential attack;

said at least one actual vulnerability includes at least one of the potential vulnerabilities to which the plurality of devices is determined to be actually vulnerable based on the identified at least one configuration;

said at least one configuration includes at least one of: service pack information, one or more elements contained in files including at least one of an *.ini or *.conf file, registry information, identification of the at least one operating system, identification of a software version, or identification of software;

said determining that the plurality of devices is actually vulnerable to the at least one accurately identified vulnerability includes at least one of: matching the identified at least one configuration with a guideline associated with at least one update, or cross-referencing an identifier with the identified at least one configuration;

said non-transitory computer-readable media includes a single non-transitory computer readable medium;

one or more of said different occurrence mitigation actions, after a user selection, is automatically applied at a later time;

one or more of said different occurrence mitigation actions puts a policy in place for being utilized at a later time;

one or more of said different occurrence mitigation actions, after an automatic application thereof, is utilized at a later time for the occurrence mitigation;

one of said different occurrence mitigation actions of the intrusion prevention system-based occurrence mitigation type utilizes an intrusion prevention system to deploy a patch;

one of said different occurrence mitigation actions of the firewall-based occurrence mitigation type utilizes a firewall to deploy a patch utilizing an update component; and wherein the instructions are configured for use with at least one NOC server, a data warehouse, and an SDK for allowing access to information associated with at least one vulnerability and at least one remediation, and wherein the instructions are configured for determining which devices have vulnerabilities by directly querying a firmware or operating system of the devices.

34. The non-transitory computer-readable media of claim 1, wherein the instructions are configured such that which of the different occurrence mitigation actions for which selective utilization is caused, is based on one or more of the actual vulnerabilities to which the plurality of devices is actually vulnerable so that utilization of only relevant occurrence mitigation actions is caused.

35. The non-transitory computer-readable media of claim 1, wherein the instructions are configured such that the utilization of the different occurrence mitigation actions is selectively caused for different devices prior to the occurrence.

36. The non-transitory computer-readable media of claim 1, wherein the instructions are configured such that the utilization of the different occurrence mitigation actions is selectively caused for different devices prior to the occurrence, resulting in: the utilization of only a first occurrence mitigation action of the firewall-based occurrence mitigation type being selectively caused at the first device in response to the occurrence, the utilization of only a second occurrence mitigation action of the intrusion prevention system-based occurrence mitigation type being selectively caused at the second device in response to the occurrence, and the utilization of both the first occurrence mitigation action and the second occurrence mitigation action being selectively caused at the third device in response to the occurrence.

37. The non-transitory computer-readable media of claim 1, wherein the instructions, when executed by the one or more processors, cause the one or more processors to:
receive a first user input;
based on the first user input, automatically apply a first one of the different occurrence mitigation actions of the firewall-based occurrence mitigation type;
receive a second user input; and
based on the second user input, automatically apply a second one of the different occurrence mitigation actions of the intrusion prevention system-based occurrence mitigation type.

38. The non-transitory computer-readable media of claim 1, wherein the instructions are configured such that each of:
said at least one first data storage includes at least one first database;
said at least one second data storage includes at least one second database;
said second vulnerability information is received from the at least one second data storage by at least one of: receiving at least one update therefrom; pulling at least one update therefrom, communicating therewith, or synchronizing therewith;
said second vulnerability information includes actual vulnerability information;
said second vulnerability information includes potential vulnerability information;
said first vulnerability information is generated via a vulnerability scan operation;
said first vulnerability information identifies at least one accurately identified vulnerability;
said first vulnerability information includes at least one of a vulnerability identifier or information associated with one or more of the accurately identified vulnerabilities;
said first vulnerability information includes potential vulnerability information;
said first device, said second device, and said third device are part of the same group;
said at least one configuration includes at least one of configuration data, configuration information, or a configuration status;
said at least one configuration includes at least one of a configuration option, a policy setting, or a patch;
said at least one configuration is utilized for identifying the at least one operating system or an application;

said at least one configuration is identified utilizing information regarding the at least one operating system or an application;
said at least one configuration is identified via user input in connection with at least one setting;
said occurrence mitigation includes at least one of removing the at least one accurately identified vulnerability, or reducing an effect of any occurrence that takes advantage of the at least one accurately identified vulnerability;
said firewall-based occurrence mitigation type includes at least one of: a type that mitigates the occurrence utilizing firewall functionality, or a type that mitigates the occurrence utilizing a firewall;
said intrusion prevention system-based occurrence mitigation type includes at least one of: a type that mitigates the occurrence utilizing intrusion prevention system functionality, or a type that mitigates the occurrence utilizing an intrusion prevention system;
said different occurrence mitigation actions of the diverse occurrence mitigation types are selectively utilized across the plurality of devices to mitigate the occurrence by preventing the occurrence from taking advantage of the at least one accurately identified vulnerability after the occurrence;
said preventing advantage being taken of the accurately identified vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;
said preventing advantage being taken of the accurately identified vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;
said preventing advantage being taken of the accurately identified vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one accurately identified vulnerability in connection with at least one of the plurality of devices;
said preventing advantage being taken of the accurately identified vulnerabilities utilizing the different occurrence mitigation actions of the diverse occurrence mitigation types across the plurality of devices, includes utilizing a first one of the different occurrence mitigation actions for a first accurately identified vulnerability and utilizing a second one of the different occurrence mitigation actions for a second accurately identified vulnerability;
said at least one accurately identified vulnerability is the at least one operating system;
said preventing advantage being taken of the accurately identified vulnerabilities utilizing the different occurrence mitigation actions of the diverse occurrence mitigation types across the plurality of devices, includes utilizing a first one of the different occurrence mitigation actions for a first aspect of the at least one accurately identified vulnerability which is the at least one operating system and utilizing a second one of the different occurrence mitigation actions for a second aspect of the at least one operating system;
one or more of said different occurrence mitigation actions is caused after the occurrence to selectively utilize the different occurrence mitigation actions of the diverse occurrence mitigation types;
one or more of said different occurrence mitigation actions is caused before the occurrence to selectively utilize the different occurrence mitigation actions of the diverse occurrence mitigation types;
said different occurrence mitigation actions include different remediation actions;
said different occurrence mitigation actions of the diverse occurrence mitigation types utilized at the plurality of devices include the same set of said different occurrence mitigation actions;
said occurrence includes at least one of a request, traffic, at least one packet, or a potential attack;
said at least one accurately identified vulnerability includes at least one of the potential vulnerabilities to which the plurality of devices is determined to be actually vulnerable based on the identified at least one configuration;
said at least one configuration includes at least one of: service pack information, one or more elements contained in files including at least one of an *.ini or *.conf file, registry information, identification of the at least one operating system, identification of a software version, or identification of software;
said determining that the plurality of devices is accurately identified as being vulnerable to the at least one accurately identified vulnerability includes at least one of: matching the identified at least one configuration with a guideline associated with at least one update, or cross-referencing an identifier with the identified at least one configuration;
said non-transitory computer-readable media includes a single non-transitory computer readable medium;
one or more of said different occurrence mitigation actions, after a user selection, is automatically applied at a later time;
one or more of said different occurrence mitigation actions puts a policy in place for being utilized at a later time;
one or more of said different occurrence mitigation actions, after an automatic application thereof, is utilized at a later time for the occurrence mitigation;
one of said different occurrence mitigation actions of the intrusion prevention system-based occurrence mitigation type utilizes an intrusion prevention system to deploy a patch;
one of said different occurrence mitigation actions of the firewall-based occurrence mitigation type utilizes a firewall to deploy a patch utilizing an update component; and
wherein the instructions are configured for use with at least one NOC server, a data warehouse, and an SDK for allowing access to information associated with at least one vulnerability and at least one remediation, and wherein the instructions are configured for determining which devices have vulnerabilities by directly querying a firmware or operating system of the devices.

39. A non-transitory computer-readable media storing instructions that, when executed by one or more processors, cause the one or more processors to:
  receive first vulnerability information from at least one first data storage that is generated utilizing second vulnerability information from at least one second data storage that is used to identify a plurality of potential vulnerabilities, by including:
    at least one first potential vulnerability, and
    at least one second potential vulnerability;
    said first vulnerability information generated utilizing the second vulnerability information, by:
      identifying at least one configuration associated with a plurality of devices including a first device, a second device, and a third device, and
      determining that the plurality of devices is actually vulnerable to at least one actual vulnerability based on the identified at least one configuration, utilizing the second vulnerability information that is used to identify the plurality of potential vulnerabilities;
  identify an occurrence in connection with at least one of the plurality of devices, utilizing one or more monitors;
  based on a packet analysis, determine that the at least one actual vulnerability of the at least one of the plurality of devices is susceptible to being taken advantage of by the occurrence identified in connection with the at least one of the plurality of devices, utilizing the first vulnerability information; and
  permit selective utilization of different occurrence mitigation actions of diverse occurrence mitigation types, including a firewall-based occurrence mitigation type and a other occurrence mitigation type, across the plurality of devices for occurrence mitigation by preventing advantage being taken of actual vulnerabilities utilizing the different occurrence mitigation actions of the diverse occurrence mitigation types across the plurality of devices;
  wherein the at least one configuration involves at least one operating system.

40. The non-transitory computer-readable media of claim 39, wherein the instructions are configured for providing at least two options via a user interface including a firewall-type option for preventing at least one occurrence packet, and another option; the instructions are configured such that, in response to user input received prior to receipt of the at least one occurrence packet, the firewall-type option is applied to the plurality of devices by sending a first signal over at least one network to at least one first component with firewall-type functionality such that the at least one occurrence packet is prevented across the plurality of devices; and the instructions are configured such that, in response to additional user input after the receipt of the at least one occurrence packet in connection with a particular single device of the plurality of devices, the other option is applied to the particular single device by sending a second signal over the at least one network to at least one second component with other functionality.

41. The non-transitory computer-readable media of claim 39, wherein the instructions are configured such that at least two options are provided including a firewall-type option associated with the firewall-based occurrence mitigation type, and an other option associated with the other occurrence mitigation type; the instructions are configured such that, in response to user input prior to receipt of at least one occurrence packet, the other option is applied to the plurality of devices; and the instructions are configured such that, in response to user input after the receipt of the at least one occurrence packet in connection with a particular single device of the plurality of devices, the firewall-type option is applied to the particular single device.

42. The non-transitory computer-readable media of claim 39, wherein the instructions are configured such that the at least one actual vulnerability is determined as a function of the at least one operating system, so that, in order to avoid false positives, only relevant vulnerabilities prompt user selection among the different occurrence mitigation actions of the diverse occurrence mitigation types in connection therewith.

43. The non-transitory computer-readable media of claim 39, wherein the instructions are configured such that which of the different occurrence mitigation actions for which one or more options are provided to a user, is based on one or more of the actual vulnerabilities to which the plurality of devices is actually vulnerable so that only relevant occurrence mitigation actions are available for selection by the user.

44. The non-transitory computer-readable media of claim 39, wherein the instructions are configured such that the at least one actual vulnerability is determined as a function of the at least one operating system and at least one some of the different occurrence mitigation actions are specific to the at least one actual vulnerability.

45. The non-transitory computer-readable media of claim 39, wherein the instructions are configured such that different user input is permitted to be received prior to the occurrence for different devices, for allowing completion of the different occurrence mitigation actions, in a manner that the different user input results in: only a first occurrence mitigation action of the firewall-based occurrence mitigation type being user-selectively completed at the first device in response to the occurrence, only a second occurrence mitigation action of the other occurrence mitigation type being user-selectively completed at the second device in response to the occurrence, and both the first occurrence mitigation action and the second occurrence mitigation action being user-selectively completed at the third device in response to the occurrence.

46. The non-transitory computer-readable media of claim 45, wherein the instructions are configured such that additional user input is permitted to be received after a reporting of the occurrence, for causing completion of the different occurrence mitigation actions, in a manner that the additional user input results in: the first occurrence mitigation action of the firewall-based occurrence mitigation type being supplemented by the second occurrence mitigation action of the other occurrence mitigation type at the first device.

47. The non-transitory computer-readable media of claim 45, wherein the instructions are configured such that additional user input is permitted to be received after a reporting of the occurrence, for prompting a rollback of one or more of the different occurrence mitigation actions, in a manner that the additional user input results in: the second occurrence mitigation action of the other occurrence mitigation type being rolled back at the third device.

48. The non-transitory computer-readable media of claim 45, wherein the instructions are configured such that additional user input is permitted to be received after a reporting of the occurrence, for causing completion of the different occurrence mitigation actions, in a manner that the additional user input results in: the second occurrence mitigation action of the other occurrence mitigation type being supplemented by the first occurrence mitigation action of the firewall-based occurrence mitigation type.

49. The non-transitory computer-readable media of claim 45, wherein the instructions are configured such that additional user input is permitted to be received after a reporting of the occurrence, for prompting a rollback of one or more of the different occurrence mitigation actions, in a manner that the additional user input results in: the first occurrence mitigation action of the firewall-based occurrence mitigation type being rolled back at the third device.

50. The non-transitory computer-readable media of claim 39, wherein the instructions are configured such that the different occurrence mitigation actions of the diverse occurrence mitigation types include: a first occurrence mitigation action of the firewall-based occurrence mitigation type including at least one of setting a configuration option, setting of a policy, or an installation of a patch; and a second occurrence mitigation action of the other occurrence mitigation type including at least one of setting the configuration option, the setting of the policy, or the installation of the patch that is different than that included in connection with the first occurrence mitigation action.

51. The non-transitory computer-readable media of claim 39, wherein the instructions are configured such that multiple options for selecting the different occurrence mitigation actions are displayed via an intrusion prevention system interface of an intrusion prevention system that is supported by a single client agent that supports at least one aspect of the identifying the occurrence, at least one aspect of automatically completing a first one of the different occurrence mitigation actions of the firewall-based occurrence mitigation type in response to a selection of a first one of the multiple options, and at least one aspect of automatically completing a second one of the different occurrence mitigation actions of the other occurrence mitigation type in response to a selection of a second one of the multiple options.

52. The non-transitory computer-readable media of claim 39, wherein the instructions, when executed by the one or more processors, cause the one or more processors to:
 display at least two options for selecting the different occurrence mitigation actions, utilizing at least one user interface;
 receive a first user input selecting a first one of the options, utilizing the at least one user interface;
 based on the first user input, automatically apply a first one of the different occurrence mitigation actions of the firewall-based occurrence mitigation type;
 receive a second user input selecting a second one of the options, utilizing the at least one user interface; and
 based on the second user input, automatically apply a second one of the different occurrence mitigation actions of the other occurrence mitigation type.

53. The non-transitory computer-readable media of claim 52, wherein the instructions are configured such that the automatic application of the first one of the different occurrence mitigation actions of the firewall-based occurrence mitigation type includes sending a first signal to at least one component with firewall functionality; and the automatic application of the second one of the different occurrence mitigation actions of the other occurrence mitigation type includes sending a second signal to at least one component with other functionality.

54. The non-transitory computer-readable media of claim 39, wherein the instructions are configured such that the different occurrence mitigation actions of the diverse occurrence mitigation types are for being automatically applied to different occurrences with different severities in real-time in response to the identification of the different occurrences based on a user selection of one or more options for selecting among the different occurrence mitigation actions before the identification of the different occurrences.

55. The non-transitory computer-readable media of claim 39, wherein the instructions, when executed by the one or more processors, cause the one or more processors to:
 based on user input, automatically block the occurrence, to prevent an attack from taking advantage of the at least one actual vulnerability while there is no installation of a patch that removes the at least one actual vulnerability.

56. The non-transitory computer-readable media of claim 39, wherein the identifying the occurrence is accomplished by: identifying at least one first occurrence packet of a first occurrence directed to the first device, and identifying at least one second occurrence packet of a second occurrence directed to the second device; the determining that the at least one actual vulnerability of the at least one of the plurality of devices is susceptible is accomplished by: identifying at least one aspect of the at least one first occurrence packet and utilizing the at least one aspect of the at least one first occurrence packet to determine whether a first actual vulnerability of the first device identified by the first vulnerability information is configured so as to be taken advantage of by the at least one first occurrence packet, and identifying at least one aspect of the at least one second occurrence packet and utilizing the at least one aspect of the at least one second occurrence packet to determine whether a second actual vulnerability of the second device identified by the first vulnerability information is configured so as to be taken advantage of by the at least one second occurrence packet; and the permitting the selective utilization of the different occurrence mitigation actions includes sending one or more control signals in response to receiving user input via a graphical user interface; wherein the instructions are configured such that, based on the user input, a first occurrence mitigation action of the different occurrence mitigation actions of the firewall-based occurrence mitigation type is completed by sending a first signal over at least one network to a first component with a firewall type functionality and preventing the first occurrence including the at least one first occurrence packet from taking advantage of the first actual vulnerability in connection with the first device; and wherein the instructions are configured such that a second occurrence mitigation action of the different occurrence mitigation actions of the other occurrence mitigation type is completed by sending a second signal to a second component with other functionality and preventing the second occurrence including the at least one second occurrence packet, in automatic response thereto, from taking advantage of the second actual vulnerability in connection with the second device.

57. The non-transitory computer-readable media of claim 39, wherein the instructions are configured such that which of the different occurrence mitigation actions for which selective utilization is permitted, is based on one or more of the actual vulnerabilities to which the plurality of devices is actually vulnerable so that utilization of only relevant occurrence mitigation actions is permitted.

58. The non-transitory computer-readable media of claim 39, wherein the instructions are configured such that the utilization of the different occurrence mitigation actions is selectively permitted for different devices prior to the occurrence.

59. The non-transitory computer-readable media of claim 39, wherein the instructions are configured such that the utilization of the different occurrence mitigation actions is selectively permitted for different devices prior to the occurrence, resulting in: the utilization of only a first occurrence mitigation action of the firewall-based occurrence mitigation type being selectively permitted at the first device in response to the occurrence, the utilization of only a second occurrence mitigation action of the other occurrence mitigation type being selectively permitted at the second device in response to the occurrence, and the utilization of both the first occurrence mitigation action and the second occurrence mitigation action being selectively permitted at the third device in response to the occurrence.

60. The non-transitory computer-readable media of claim 39, wherein the instructions are configured such that one or more options are provided to a user so that the user is permitted to select each of the different occurrence mitigation actions of the diverse occurrence mitigation types in connection with the at least one actual vulnerability which includes a single actual vulnerability, such that both of the different occurrence mitigation actions are associated with the single actual vulnerability.

61. The non-transitory computer-readable media of claim 39, wherein the instructions, when executed by the one or more processors, cause the one or more processors to:
determine the occurrence to have a first severity if it is determined that the at least one actual vulnerability of the at least one of the plurality of devices is susceptible to being taken advantage of by the occurrence;
determine the occurrence to have a second severity if it determined that the at least one actual vulnerability of the at least one of the plurality of devices is not susceptible to being taken advantage of by the occurrence; and
report the occurrence differently based on whether the occurrence is determined to have the first severity or the second severity.

62. The non-transitory computer-readable media of claim 39, wherein the instructions, when executed by the one or more processors, cause the one or more processors to:
receive a first user input;
based on the first user input, automatically apply a first one of the different occurrence mitigation actions of the firewall-based occurrence mitigation type;
receive a second user input; and
based on the second user input, automatically apply a second one of the different occurrence mitigation actions of the other occurrence mitigation type.

63. The non-transitory computer-readable media of claim 39, wherein the other occurrence mitigation type includes a scan-based occurrence mitigation type.

64. The non-transitory computer-readable media of claim 39, wherein the other occurrence mitigation type includes a patch-based occurrence mitigation type.

65. The non-transitory computer-readable media of claim 56, wherein the instructions are configured such that at least one of:
said at least one first data storage includes at least one first database;
said at least one second data storage includes at least one second database;
said second vulnerability information is received from the at least one second data storage by at least one of: receiving at least one update therefrom; pulling at least one update therefrom, communicating therewith, or synchronizing therewith;
said second vulnerability information includes accurately identified vulnerability information;
said second vulnerability information includes actual vulnerability information;
said first vulnerability information is generated via a vulnerability scan operation;
said first vulnerability information includes potential vulnerability information;
said first device, said second device, and said third device are part of the same group;
said at least one configuration includes at least one of configuration data, configuration information, or a configuration status;
said at least one configuration includes at least one of a configuration option, a policy setting, or a patch;
said at least one configuration is identified via user input in connection with at least one setting;
said occurrence mitigation by preventing advantage being taken includes at least one of removing the at least one actual vulnerability, or reducing an effect of any occurrence that takes advantage of the at least one actual vulnerability;
said firewall-based occurrence mitigation type includes at least one of: a type that mitigates the occurrence utilizing firewall functionality, or a type that mitigates the occurrence utilizing a firewall;
said different occurrence mitigation actions of the diverse occurrence mitigation types are selectively utilized across the plurality of devices to mitigate the occurrence by preventing the occurrence from taking advantage of the at least one actual vulnerability after the occurrence;
said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;
said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;
said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one actual vulnerability in connection with at least one of the plurality of devices;
said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;
said packet analysis includes an analysis involving the occurrence that involves one or more packets;
said packet analysis includes an analysis involving a behavior of one or more packets;

said packet analysis includes an analysis involving a content of one or more packets;
said packet analysis includes an analysis involving a header of one or more packets;
said packet analysis includes an analysis involving a payload of one or more packets;
said one or more monitors includes a single monitor;
said one or more monitors includes multiple monitors;
said one or more monitors includes at least one sensor monitor;
said one or more monitors includes at least one in-line sensor monitor;
said one or more monitors includes is in-line;
said one or more monitors includes at least one intrusion prevention system monitor;
said one or more monitors includes at least one intrusion detection system monitor;
said one or more monitors includes at least one intrusion prevention monitor;
said one or more monitors includes at least one intrusion detection monitor;
said at least one actual vulnerability includes the at least one operating system;
said actual vulnerabilities include the at least one actual vulnerability;
said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one actual vulnerability which includes the at least one operating system and utilizing a second one of the different occurrence mitigation actions for a second aspect of the at least one operating system;
one or more of said different occurrence mitigation actions is caused after the occurrence to selectively utilize the different occurrence mitigation actions of the diverse occurrence mitigation types;
one or more of said different occurrence mitigation actions is caused before the occurrence to selectively utilize the different occurrence mitigation actions of the diverse occurrence mitigation types;
said different occurrence mitigation actions include different remediation actions;
said different occurrence mitigation actions of the diverse occurrence mitigation types utilized at the plurality of devices include the same set of said different occurrence mitigation actions;
said occurrence includes at least one of a request, traffic, at least one packet, or a potential attack;
said user input includes separate user input for selecting the first occurrence mitigation action and the second occurrence mitigation action;
said first signal and the second signal include at least one of response signals, or signals sent in response to a query signal;
said first component with the firewall type functionality includes at least one of a firewall, a gateway with the firewall type functionality, a router with the firewall type functionality, a sensor with the firewall type functionality, or a multiple-security product system with the firewall type functionality;
said preventing includes at least one of rejecting a request, disallowing an attempt, dropping at least one packet, blocking a potential attack, redirecting a request, setting a policy, affecting a service, changing a configuration option, or installing a patch; or
said automatic response includes a real-time response.

66. The non-transitory computer-readable media of claim 41, wherein the instructions are configured such that each of:
said at least one first data storage includes at least one first database;
said at least one second data storage includes at least one second database;
said second vulnerability information is received from the at least one second data storage by at least one of: receiving at least one update therefrom; pulling at least one update therefrom, communicating therewith, or synchronizing therewith;
said first vulnerability information is generated via a vulnerability scan operation;
said first vulnerability information identifies at least one actual vulnerability;
said first vulnerability information includes at least one of a vulnerability identifier or information associated with one or more of the actual vulnerabilities;
said first device, said second device, and said third device are part of the same group;
said at least one configuration includes at least one of configuration data, configuration information, or a configuration status;
said at least one configuration includes at least one of a configuration option, a policy setting, or a patch;
said at least one configuration for being utilized for identifying the at least one operating system or an application;
said at least one configuration is identified utilizing information regarding the at least one operating system or an application;
said at least one configuration is identified via user input in connection with at least one setting;
said occurrence mitigation includes at least one of removing the at least one actual vulnerability, or reducing an effect of any occurrence that takes advantage of the at least one actual vulnerability;
said firewall-based occurrence mitigation type includes at least one of: a type that mitigates the occurrence utilizing firewall functionality, or a type that mitigates the occurrence utilizing a firewall;
said other occurrence mitigation type includes at least one of: a type that mitigates the occurrence utilizing intrusion prevention system functionality, or a type that mitigates the occurrence utilizing an intrusion prevention system;
said different occurrence mitigation actions of the diverse occurrence mitigation types are selectively utilized across the plurality of devices to mitigate the occurrence by preventing the occurrence from taking advantage of the at least one actual vulnerability after the occurrence;
said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;
said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;

said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one actual vulnerability in connection with at least one of the plurality of devices;

said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;

said at least one actual vulnerability is the at least one operating system;

said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one actual vulnerability which is the at least one operating system and utilizing a second one of the different occurrence mitigation actions for a second aspect of the at least one operating system;

one or more of said different occurrence mitigation actions is caused after the occurrence to selectively utilize the different occurrence mitigation actions of the diverse occurrence mitigation types;

one or more of said different occurrence mitigation actions is caused before the occurrence to selectively utilize the different occurrence mitigation actions of the diverse occurrence mitigation types;

said different occurrence mitigation actions include different remediation actions;

said different occurrence mitigation actions of the diverse occurrence mitigation types utilized at the plurality of devices include the same set of said different occurrence mitigation actions;

said occurrence includes at least one of a request, traffic, at least one packet, or a potential attack;

said at least one actual vulnerability includes at least one of the potential vulnerabilities to which the plurality of devices is determined to be actually vulnerable based on the identified at least one configuration;

said at least one configuration includes at least one of: service pack information, one or more elements contained in files including at least one of an *.ini or *.conf file, registry information, identification of the at least one operating system, identification of a software version, or identification of software;

said determining that the plurality of devices is actually vulnerable to the at least one actual vulnerability includes at least one of: matching the identified at least one configuration with a guideline associated with at least one update, or cross-referencing an identifier with the identified at least one configuration;

said non-transitory computer-readable media includes a single non-transitory computer readable medium;

one or more of said different occurrence mitigation actions, after a user selection, is automatically applied at a later time;

one or more of said different occurrence mitigation actions puts a policy in place for being utilized at a later time;

one or more of said different occurrence mitigation actions, after an automatic application thereof, is utilized at a later time for the occurrence mitigation;

one of said different occurrence mitigation actions of the other occurrence mitigation type utilizes an intrusion prevention system to deploy a patch;

said one or more monitors includes at least one sensor monitor;

said one or more monitors includes at least one in-line sensor monitor;

said one or more monitors includes is in-line;

said one or more monitors includes at least one intrusion prevention system monitor;

said one or more monitors includes at least one intrusion detection system monitor;

said one or more monitors includes at least one intrusion prevention monitor;

said one or more monitors includes at least one intrusion detection monitor;

one of said different occurrence mitigation actions of the firewall-based occurrence mitigation type utilizes a firewall to deploy a patch utilizing an update component; and wherein the instructions are configured for use with at least one NOC server, a data warehouse, and an SDK for allowing access to information associated with at least one vulnerability and at least one remediation, and wherein the instructions are configured for determining which devices have vulnerabilities by directly querying a firmware or operating system of the devices.

67. The non-transitory computer-readable media of claim 41, wherein the instructions are configured such that which of the different occurrence mitigation actions for which selective utilization is caused, is based on one or more of the actual vulnerabilities to which the plurality of devices is actually vulnerable so that utilization of only relevant occurrence mitigation actions is caused.

68. The non-transitory computer-readable media of claim 41, wherein the instructions are configured such that the utilization of the different occurrence mitigation actions is selectively caused for different devices prior to the occurrence.

69. The non-transitory computer-readable media of claim 41, wherein the instructions are configured such that the utilization of the different occurrence mitigation actions is selectively caused for different devices prior to the occurrence, resulting in: the utilization of only a first occurrence mitigation action of the firewall-based occurrence mitigation type being selectively caused at the first device in response to the occurrence, the utilization of only a second occurrence mitigation action of the other occurrence mitigation type being selectively caused at the second device in response to the occurrence, and the utilization of both the first occurrence mitigation action and the second occurrence mitigation action being selectively caused at the third device in response to the occurrence.

70. The non-transitory computer-readable media of claim 41, wherein the instructions, when executed by the one or more processors, cause the one or more processors to:

receive a first user input;
based on the first user input, automatically apply a first one of the different occurrence mitigation actions of the firewall-based occurrence mitigation type;
receive a second user input; and
based on the second user input, automatically apply a second one of the different occurrence mitigation actions of the other occurrence mitigation type.

* * * * *

Disclaimer

10,609,063 B1 - Brett M. Oliphant, Plano, TX (US); John P. Blignaut, West Lafayette, IN (US). COMPUTER PROGRAM PRODUCT AND APPARATUS FOR MULTI-PATH REMEDIATION. Patent dated March 31, 2020. Disclaimer filed December 16, 2021, by the assignee, SecurityProfiling, LLC.

I hereby disclaim the following complete claims 1 and 5 of said patent.

*(Official Gazette, November 22, 2022)*